(12) United States Patent
Kim et al.

(10) Patent No.: US 12,368,212 B2
(45) Date of Patent: Jul. 22, 2025

(54) BATTERY MODULE, AND BATTERY PACK AND ENERGY STORAGE SYSTEM INCLUDING THE SAME

(71) Applicant: LG ENERGY SOLUTION, LTD., Seoul (KR)

(72) Inventors: Seung-Hyun Kim, Daejeon (KR); Kyung-Hyun Bae, Daejeon (KR); Seung-Min Ok, Daejeon (KR); Da-Been Lee, Daejeon (KR); Sang-Jin Lee, Daejeon (KR); Chan-Young Jeong, Daejeon (KR); Sang-Hyun Jo, Daejeon (KR); Young-Bum Cho, Daejeon (KR); Sung-Goen Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/878,457

(22) PCT Filed: Jul. 14, 2023

(86) PCT No.: PCT/KR2023/010083
§ 371 (c)(1),
(2) Date: Dec. 23, 2024

(87) PCT Pub. No.: WO2024/080505
PCT Pub. Date: Apr. 18, 2024

(65) Prior Publication Data
US 2025/0174821 A1    May 29, 2025

(30) Foreign Application Priority Data

Oct. 12, 2022  (KR) .................. 10-2022-0130431
May 10, 2023  (KR) .................. 10-2023-0060685

(51) Int. Cl.
*H01M 50/383* (2021.01)
*H01M 10/613* (2014.01)
(Continued)

(52) U.S. Cl.
CPC ....... *H01M 50/383* (2021.01); *H01M 10/613* (2015.04); *H01M 10/647* (2015.04);
(Continued)

(58) Field of Classification Search
CPC ................................................. H01M 50/211
See application file for complete search history.

(56) References Cited

U.S. PATENT DOCUMENTS

2012/0196170 A1   8/2012  Ljaz et al.
2016/0226055 A1   8/2016  Miyake
(Continued)

FOREIGN PATENT DOCUMENTS

CN       114824595 A    7/2022
KR   10-2017-0035218 A  3/2017
(Continued)

OTHER PUBLICATIONS

International Search Report for PCT/KR2023/010083 (PCT/ISA/210) mailed on Oct. 18, 2023.
(Continued)

*Primary Examiner* — Maria Laios
(74) *Attorney, Agent, or Firm* — Birch, Stewart, Kolasch & Birch, LLP

(57) ABSTRACT

A battery module includes a cell stack formed by stacking a plurality of battery cells including a receiving portion in which an electrode assembly is accommodated, a first edge portion and a second edge portion along the longitudinal direction around the receiving portion, and a third edge portion and a fourth edge portion along the width direction, in the vertical direction with the receiving portions facing (Continued)

each other, the battery cell includes a resealing portion at the first edge portion, and includes a sealing portion or an unsealed portion at the second edge portion, and the first edge portion and the second edge portion are alternately positioned along the vertical direction on both sides of the cell stack.

18 Claims, 19 Drawing Sheets

(51) Int. Cl.
- *H01M 10/647* (2014.01)
- *H01M 10/6551* (2014.01)
- *H01M 10/658* (2014.01)
- *H01M 50/211* (2021.01)
- *H01M 50/271* (2021.01)
- *H01M 50/507* (2021.01)

(52) U.S. Cl.
CPC ..... *H01M 10/6551* (2015.04); *H01M 10/658* (2015.04); *H01M 50/211* (2021.01); *H01M 50/271* (2021.01); *H01M 50/507* (2021.01)

(56) References Cited

U.S. PATENT DOCUMENTS

| | | |
|---|---|---|
| 2017/0190264 A1 | 7/2017 | Kim et al. |
| 2018/0190952 A1 | 7/2018 | Kim et al. |
| 2021/0126232 A1 | 4/2021 | Kim et al. |
| 2022/0238924 A1 | 7/2022 | Cha |
| 2022/0376288 A1 | 11/2022 | Kwak |
| 2023/0099554 A1 | 3/2023 | Jo et al. |
| 2023/0128563 A1 | 4/2023 | Hong et al. |
| 2023/0198091 A1 | 6/2023 | Oh et al. |
| 2023/0327254 A1 | 10/2023 | Kim et al. |

FOREIGN PATENT DOCUMENTS

| | | |
|---|---|---|
| KR | 10-2017-0082041 A | 7/2017 |
| KR | 10-2017-0132565 A | 12/2017 |
| KR | 10-2018-0137348 A | 12/2018 |
| KR | 10-2056365 B1 | 12/2019 |
| KR | 10-2021-0032219 A | 3/2021 |
| KR | 10-2021-0072322 A | 6/2021 |
| KR | 10-2021-0077416 A | 6/2021 |
| KR | 10-2022-0001228 A | 1/2022 |
| KR | 10-2022-0003876 A | 1/2022 |
| KR | 10-2022-0029482 A | 3/2022 |
| KR | 10-2022-0030544 A | 3/2022 |
| KR | 10-2022-0036171 A | 3/2022 |
| KR | 10-2022-0101459 A | 7/2022 |

OTHER PUBLICATIONS

Written Opinion of the International Searching Authority for PCT/KR2023/010083 (PCT/ISA/237) mailed on Oct. 18, 2023.
Extended European Search Report for European Application No. 23877435.0, dated May 13, 2025.

BATTERY MODULE, AND BATTERY PACK AND ENERGY STORAGE SYSTEM INCLUDING THE SAME

TECHNICAL FIELD

The present disclosure relates to a battery module, and a battery pack and an energy storage system (ESS) including the same, and more specifically, to a battery module preventing ignition, and a battery pack and an ESS including the same. The present application claims priority to Korean Patent Application No. 10-2022-0130431 filed on Oct. 12, 2022 and Korean Patent Application No. 10-2023-0060685 filed on May 10, 2023, the disclosures of which are incorporated herein by reference.

BACKGROUND ART

As the technology development and demand for various mobile devices, electric vehicles, ESSs, and the like increase significantly, the interest in and demand for secondary batteries as an energy source are rapidly increasing. Nickel cadmium batteries or nickel hydrogen batteries have been widely used as conventional secondary batteries, but recently, lithium secondary batteries having advantages of free charge/discharge, very low self-discharge rate, and high energy density due to little memory effect compared to nickel-based secondary batteries, are widely used.

Lithium secondary batteries mainly use a lithium-based oxide and a carbon material as a positive electrode active material and a negative electrode active material, respectively. Lithium secondary batteries include an electrode assembly in which a positive electrode plate and a negative electrode plate coated with the positive electrode active material and the negative electrode active material, respectively, are disposed with a separator therebetween, and an exterior material that seals and accommodates the electrode assembly together with an electrolyte, that is, a battery case.

In general, lithium secondary batteries may be classified into can-type secondary batteries in which electrode assemblies are embedded in a metal can and pouch-type secondary batteries in which electrode assemblies are embedded in a pouch of aluminum laminate sheets, depending on the shape of an exterior material.

Recently, battery packs have been widely used for driving or energy storage in medium/large devices such as electric vehicles and ESSs. A battery pack includes one or more battery modules and a control unit that controls charge/discharge of the battery pack, inside a pack case. Here, the battery module is configured to include a plurality of battery cells inside a module housing. That is, in the case of a battery pack, a plurality of battery cells (secondary batteries) are accommodated inside a module housing to form each battery module, and one or more of these battery modules are accommodated inside the pack case to form a battery pack. In particular, pouch-type battery cells have advantages in various aspects, such as light weight and less dead space when stacked, but are problematic in that they are vulnerable to external impact and somewhat inferior in assemblability. Therefore, it is common for a battery pack to be manufactured by first modularizing a plurality of battery cells and then accommodating them inside a pack case.

Although pouch-type battery cells have excellent electrical characteristics, a decomposition reaction of active materials and electrolytes, which are components of the battery, are triggered under abnormal operating conditions such as overcharging, over-discharging, exposure to high temperatures, and electrical short circuits, thereby generating heat and gas, and as a result, there may be a problem of occurrence of a so-called swelling phenomenon that the secondary battery expands. The swelling phenomenon accelerates this decomposition reaction, which may result in explosion and ignition of the battery cell due to a thermal runaway phenomenon.

That is, flare, which is a flame that flashes out of a weakly sealed part, spark, which is a highly heated particle emitted by the deintercalation of the internal electrode and the melting of the aluminum current collector, and high-temperature vent gas are generated in the event of thermal runaway of a battery cell. In particular, they do not just stay in that location, but also move to surrounding modules, including battery cells located nearby, thereby being highly likely to lead to a major accident.

In the existing field of battery ignition suppression, the technology of blocking sparks and flames with physical partition walls has been dominant by treating that there are no directional venting of battery cells and flame directionality. In addition, changing only the blocking method without adjusting the arrangement of the heat source to solve battery ignition has reached the limit in solving thermal propagation when energy density increases.

DISCLOSURE

Technical Problem

The present disclosure is designed to solve the problems of the related art, and therefore the present disclosure is directed to providing a battery module capable of preventing battery fires, especially explosive fires accompanied by auto ignition.

The present disclosure is also directed to providing a battery pack and an ESS having improved safety by including such a battery module preventing ignition.

Technical Solution

A battery module of the present disclosure for solving the above-described problem includes a cell stack formed by stacking a plurality of battery cells including a receiving portion in which an electrode assembly is accommodated, a first edge portion and a second edge portion along the longitudinal direction around the receiving portion, and a third edge portion and a fourth edge portion along the width direction, in the vertical direction with the receiving portions facing each other, the battery cell includes a resealing portion at the first edge portion, and includes a sealing portion or an unsealed portion at the second edge portion, and the first edge portion and the second edge portion are alternately positioned along the vertical direction on both sides of the cell stack.

A battery module according to an embodiment of the present disclosure may further include a module housing accommodating the cell stack, the module housing may include a pair of side plates located on both sides of the cell stack, and the side plate and the cell stack may be spaced apart to form a space portion.

A battery module may further include a polycarbonate (PC) sheet and a mica sheet between the module housing and the side of the cell stack.

A first edge portion of approximately half of the plurality of battery cells may face one of the side plates, and a first edge portion of the remaining battery cells may face the other of the side plates.

A battery module according to another embodiment of the present disclosure may further include a module housing accommodating the cell stack, the module housing may include a pair of side plates located on both sides of the cell stack and a top plate covering the upper portion of the cell stack, and the side plates may have a greater thickness than the top plate.

A battery module according to still another embodiment of the present disclosure may further include a module housing accommodating the cell stack, the module housing may include a pair of side plates located on both sides of the cell stack and a top plate covering the upper portion of the cell stack, and the side plate may be made of a material whose specific heat is higher than that of the top plate.

A battery module according to still another embodiment of the present disclosure may further include a module housing accommodating the cell stack, the module housing may include a pair of side plates located on both sides of the cell stack, and heat dissipation fins may be formed on the outer side of the side plate.

A battery module according to still another embodiment of the present disclosure may further include a thermal spreader between the module housing and the side of the cell stack.

A battery module of the present disclosure may further include a buffer pad located on at least one of the upper portion and the lower portion of the cell stack.

A battery module of the present disclosure may also further include an insulating plate located on at least one of the upper portion and the lower portion of the cell stack.

The module housing may further include a base plate supporting the cell stack and a top plate covering the upper portion of the cell stack, and the base plate may have a U-frame structure capable of wrapping and fixing the lower end of the side plate from the outside.

Here, the top plate and the side plates may be connected to each other to form a U-frame structure.

A battery module of the present disclosure may further include a module housing accommodating the cell stack, the module housing may include a pair of side plates located on both sides of the cell stack and a top plate covering the upper portion of the cell stack, the module housing may have a module opening formed in the longitudinal direction, and the module housing may further include a busbar frame assembly covering the module opening.

In the present disclosure, the pair of side plates may include a pair of spark direction switching portions formed by bending one end in the longitudinal direction toward the cell stack.

Here, the battery module may further include a fastening frame that connects the pair of spark direction switching portions and has an empty center thereof.

In addition, the battery cell may include electrode leads at the third edge portion and the fourth edge portion, the module housing may further include a top plate covering the upper portion of the cell stack, the module housing may have a module opening formed in the longitudinal direction, the module housing may further include a busbar frame assembly covering the module opening, and the busbar frame assembly may be in close contact with the spark direction switching portion and the fastening frame.

For solving the above other problems, the present disclosure provides a battery pack including such a battery module.

In addition, the present disclosure also provides an ESS including such a battery module or battery pack.

Advantageous Effects

According to one aspect of the present disclosure, when stacking battery cells to make a battery module, a battery pack, and the like, the resealing portions are stacked in a zigzag manner so that the resealing portions are not tilted in only one direction. Zigzag stacking allows sealing portions to be placed on both sides of the cell stack, that is, in both directions. The resealing portion, which is relatively weak in sealing, may be opened to allow two-way directional venting or thermal energy dispersion. Through this, a large amount of sparks and high-temperature, high-pressure flares emitted from battery cell thermal runaway may be dispersed to lower the pressure and keep the temperature of the outer wall of the battery module or battery pack below 500° C., thereby blocking auto ignition and explosion generated by contact with hydrogen and oxygen in the surrounding vent gas.

According to another aspect of the present disclosure, by improving the module housing, the temperature of the side plate of the module housing may be managed to be below 500° C. even if vent gas is discharged through the resealing portion. Therefore, it is possible to effectively prevent auto ignition generated by contact with hydrogen and oxygen in the surrounding vent gas.

According to still another aspect of the present disclosure, by improving the module housing, the movement of flares and sparks generated during thermal runaway of battery cells may be blocked, thereby preventing fires from occurring or preventing flames from moving to nearby battery modules.

DESCRIPTION OF DRAWINGS

The accompanying drawings illustrate a preferred embodiment of the present disclosure and together with the foregoing disclosure, serve to provide further understanding of the technical features of the present disclosure, and thus the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
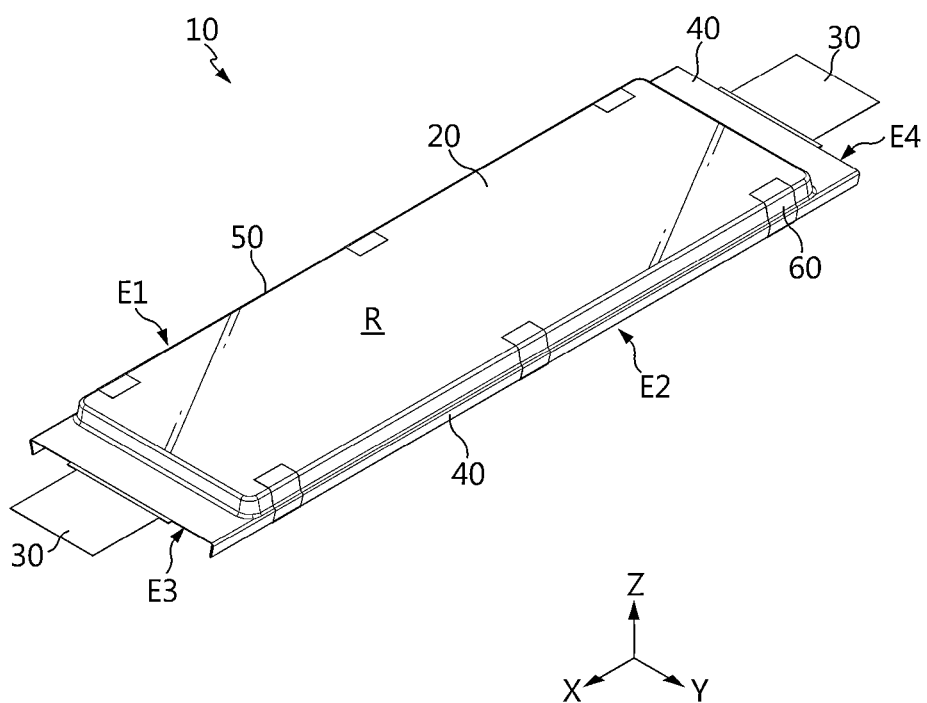
FIG. 1 is a perspective view of a battery cell included in a battery module according to an embodiment of the present disclosure.

FIG. 1 is a perspective view of a battery cell included in a battery module according to an embodiment of the present disclosure.

Referring to FIG. 1, the battery cell 10 includes a pouch exterior material 20 and an electrode assembly (not shown), and a pair of electrode leads 30 protrude outward from the pouch exterior material 20. And, the battery cell 10 includes a sealing portion 40 and a resealing portion 50. In this way, the battery cell 10 is a pouch-type battery cell.

Here, the electrode assembly may include a jelly-roll type assembly in which a separator is interposed between a long sheet-like positive electrode and negative electrode and then wound, a stack type assembly in which a rectangular positive electrode and negative electrode are stacked with a separator interposed between them, a stack-folding type assembly in which unit cells are wound by a long separation film, or a lamination-stack type assembly in which battery cells are stacked with a separator interposed between them and attached to each other, but is not limited thereto.

In addition, it is a matter of course that the electrolyte may be replaced with a solid electrolyte or a quasi-solid electrolyte in the form of a gel that is intermediate between a liquid and a solid by adding additives to the solid electrolyte, in addition to the commonly used liquid electrolyte.

The electrode assembly as described above is accommodated in the pouch exterior material 20, and the pouch exterior material 20 typically has a laminated sheet structure of an inner layer/metal layer/outer layer. Since the inner layer is in direct contact with the electrode assembly, it should have insulating property and electrolyte resistance, and the sealing property for sealing to the outside, that is, the sealing portion where the inner layers are thermally bonded, should have excellent thermal bonding strength. The material of this inner layer may be selected from polyolefin-based resins such as polypropylene, polyethylene, polyethylene acrylic acid and polybutylene, polyurethane resin, and polyimide resin, which have excellent chemical resistance and good sealing properties, but is not limited to thereto, and among them, polypropylene having excellent mechanical properties such as tensile strength, rigidity, surface hardness and impact resistance, and chemical resistance, is most preferred.

The metal layer in contact with the inner layer corresponds to a barrier layer that prevents moisture or various gases from penetrating into the battery from the outside, and an aluminum thin film that is lightweight and has excellent formability may be used as a preferred material for this metal layer.

And, the other side of the metal layer is provided with an outer layer, which can be made of a heat-resistant polymer having excellent tensile strength, moisture permeability prevention, and air permeability prevention to secure heat resistance and chemical resistance while protecting the electrode assembly, and as an example, nylon or polyethylene terephthalate may be used, but is not limited thereto.

Meanwhile, the pair of electrode leads 30 are composed of a positive electrode lead and a negative electrode lead, and may be exposed to the outside of the pouch exterior material 20 after the positive electrode and negative electrode tabs of the electrode assembly are electrically connected, respectively, or may be directly connected to the electrode assembly by omitting the tabs.

The battery cell 10 may include a receiving portion R in which the electrode assembly is accommodated, and edge portions E1 to E4 around the receiving portion R. For example, the battery cell 10 has a first edge portion E1 and a second edge portion E2 along the longitudinal direction (X-axis direction in the drawing), and a third edge portion E3 and a fourth edge portion E4 along the width direction (Y-axis direction in the drawing). In this way, the battery cell 10 may have four edge portions E1 to E4. In this embodiment, the electrode leads 30 are included in the third edge portion E3 and the fourth edge portion E4. A space between the two ends of the electrode leads 30 protruding from the pouch exterior material 20 may be defined as a longitudinal direction of the battery cell 10. As such, the electrode leads 30 may be provided at both front and rear ends in the longitudinal direction of the battery cell 10, that is, at the front end and the rear end of the battery cell 10.

The first edge portion E1 includes a resealing portion 50. The third edge portion E3 and the fourth edge portion E4 include a sealing portion 40. In the case of a four-sided sealing method, the second edge portion E2 also includes the sealing portion 40. In the case of a three-sided sealing method, only the second edge portion E2 may include an unsealed portion. Here, the unsealed portion refers to a portion where the pouch exterior material is folded. In the illustrated example, an example of a four-sided sealing method is shown. Accordingly, the first edge portion E1 includes the resealing portion 50, and the second edge portion E2, the third edge portion E3, and the fourth edge portion E4 include the sealing portion 40.

The sealing portion 40 is a portion where the pouch exterior material 20 is bonded to seal the perimeter of the receiving portion R. The resealing portion 50 refers to a sealing portion resulting from a resealing operation performed after the degassing process of the battery cell 10.

In configuring a battery module or battery pack using battery cells, the space occupied by the battery cell within the device may be reduced by minimizing the battery module size to increase space utilization, or the size of the electrode assembly may be increased with the resulting surplus part by minimizing the area occupied by the sealing portion for a certain battery module size to increase the capacity of the secondary battery. For the latter, dimensions are mostly managed by folding the sealing portion located on the side of the battery cell to form a folding portion. In the illustrated example, the resealing portion 50 of the first edge portion E1 and the sealing portion 40 of the second edge portion E2 are folded. However, if it is simply folded, it may unfold due to the springback cell swelling phenomenon of the folding portion itself, and thus the folding portion may be taped to prevent this. Reference numeral 60 is a taping member.

A plurality of the battery cells 10 described above may be stacked along the Z-axis direction to form a battery module. Since the battery cells 10 have a flat shape along the XY plane, it is very advantageous to densely stack the battery cells 10 along the Z-axis direction.

Figure 2:
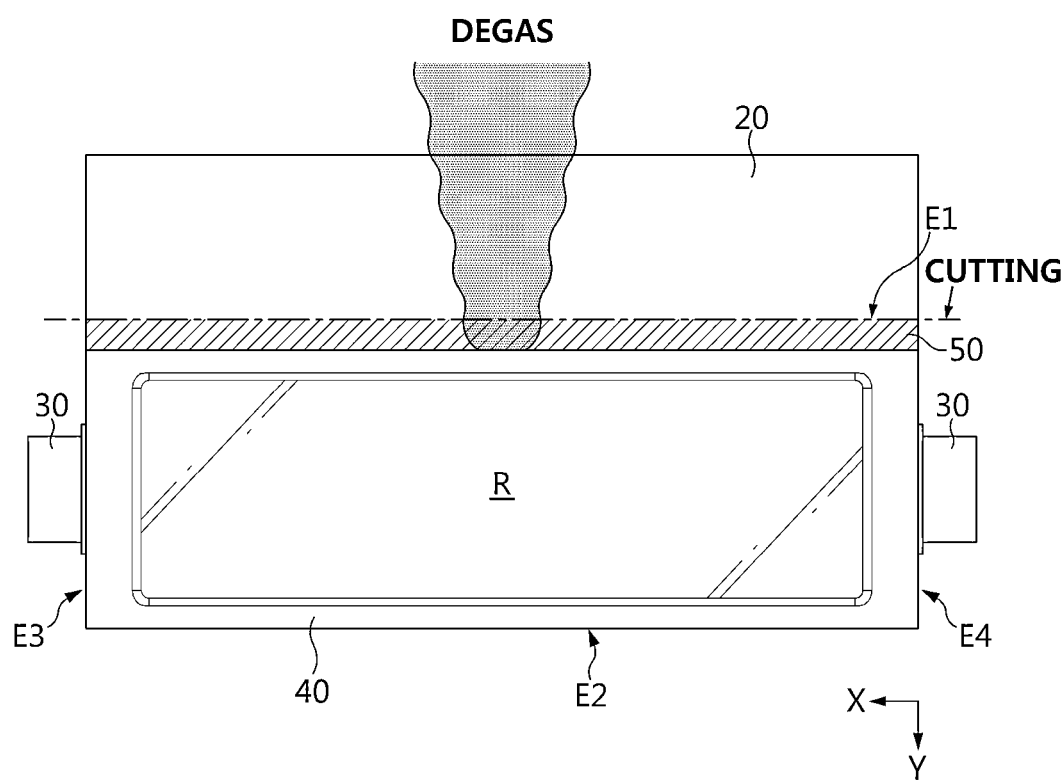
FIG. 2 is a view for describing a method of manufacturing a battery cell included in a battery module according to an embodiment of the present disclosure.

FIG. 2 is a view for describing a method of manufacturing a battery cell included in a battery module according to an embodiment of the present disclosure.

The battery cell 10 is manufactured by a process of assembling a secondary battery and a process of activating the secondary battery.

The pouch exterior material 20 may include a lower exterior material in which the electrode assembly is accommodated, and an upper exterior material that seals the top of the lower exterior material. In the case of a four-sided sealing method, the lower exterior material and the upper exterior material are two separate sheets. In the case of a three-sided sealing method, one sheet of pouch exterior material can be folded to form a lower exterior material and an upper exterior material.

The secondary battery is assembled by accommodating the electrode assembly in the receiving portion R of the lower exterior material, then pressing the edge around the receiving portion R of the lower exterior material and the corresponding edge of the upper exterior material, thermally welding a part of the pressed portions, adding an electrolyte, and vacuum sealing the remaining part thereof. The receiving portion R may also be formed in the upper exterior material. By the four-sided sealing method, all four edge portions E1 to E4 are once formed as sealing portions 40.

In the activation process, the secondary battery is mounted on a predetermined jig for smooth flow of current, and a process such as charge/discharge or the like is performed as necessary conditions for activation. Due to the nature of the secondary battery, this activation process should be preceded for the activation of the positive electrode active material and the creation of a stable solid electrolyte interface (SEI) on the negative electrode in the first cycle. During the activation process, a large amount of gas is generated inside the secondary battery. Then, the generated gas is removed through an open or incised outlet, and the gas discharge part is thermally welded again to be sealed. The process of discharging the gas inside the secondary battery and thermally welding the discharge passage as described above is commonly referred to as a degas or degassing process. And, the part that has been thermally welded and sealed again is the very resealing portion 50. In this embodiment, the resealing portion 50 is included in the first edge portion E1. The surplus pouch exterior material 20 on the outer part of the resealing portion 50 is cut and removed.

Since the resealing portion 50 of the first edge portion E1 is formed by resealing after a degassing process, the inventors have found that it has a weaker sealing strength than the sealing portion 40 of the second edge portion E2 on the opposite side and thus tends to be torn first in the event of thermal runaway. In addition, it has been found that when a plurality of battery cells 10 are accommodated in a module housing, if this resealing portion 50 is concentrated on one side, the module housing may melt if it is an aluminum enclosure. In addition, it has been found that when a plurality of battery cells 10 are accommodated, if this resealing portion 50 is concentrated on one side, the module housing may not melt, but the temperature of the outer wall thereof becomes high up to 800° C. or higher if it is made of steel. At this time, if the temperature exceeds 505° C., there is a high possibility that the hydrogen in the vent gas flowing around it may mix with oxygen and explode. This is auto ignition. The inventors came up with the present disclosure based on the fact that auto ignition of a battery module may be prevented by controlling the temperature of the module housing by adjusting the arrangement of the resealing portion 50.

Figure 3:
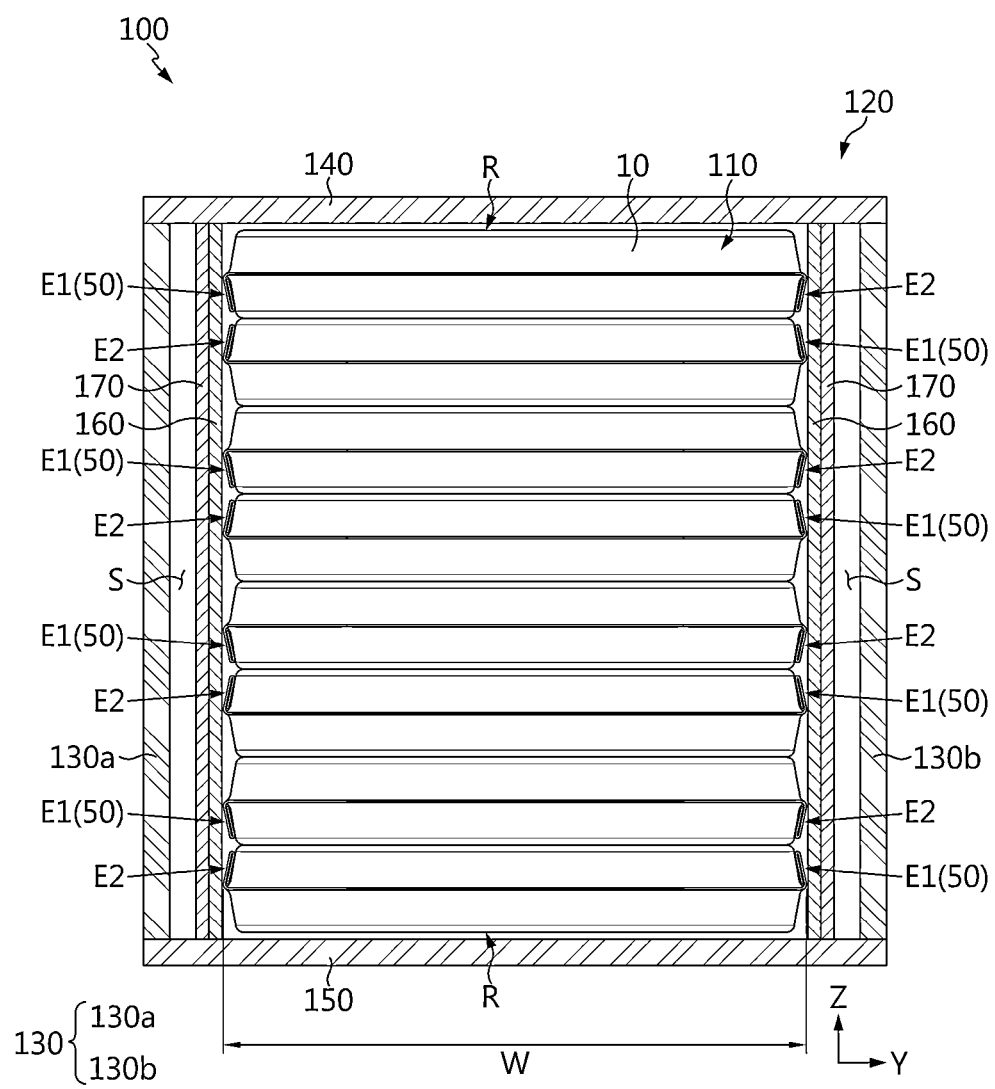
FIG. 3 is a cross-sectional view of a battery module according to an embodiment of the present disclosure.
Figure 4:
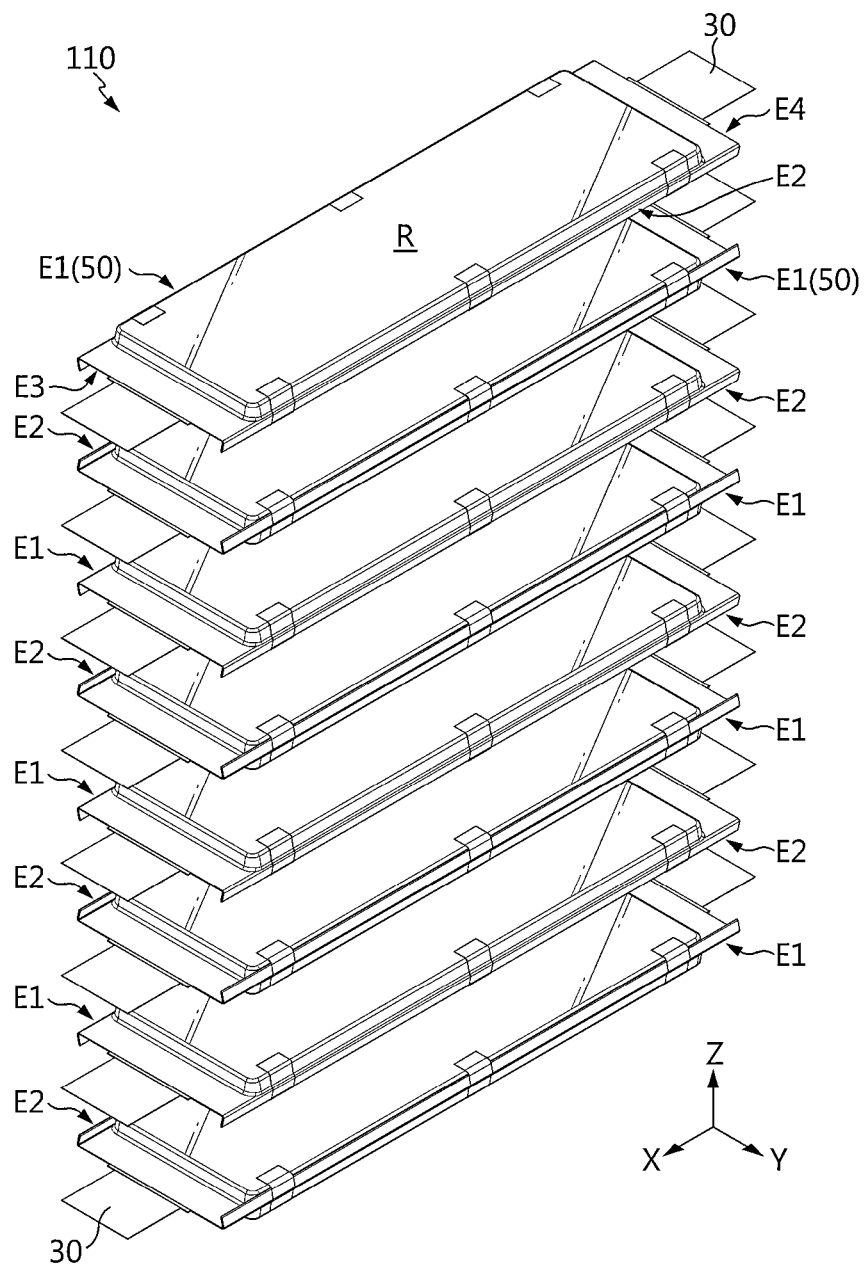
FIG. 4 is an exploded perspective view of a cell stack included in the battery module of FIG. 3.
Figure 5:
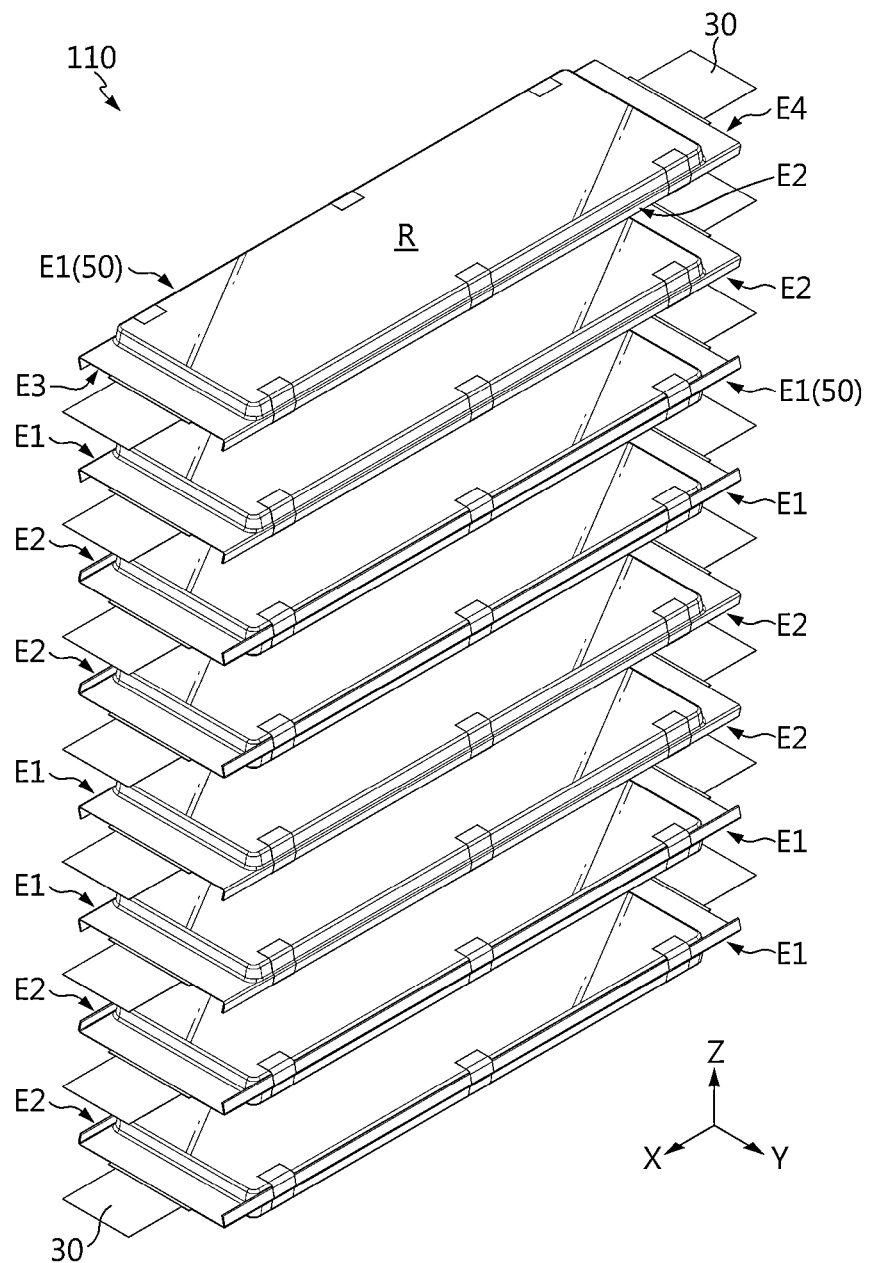
FIG. 5 is an exploded perspective view showing another example of a cell stack.

FIG. 3 is a cross-sectional view of a battery module according to an embodiment of the present disclosure. A cross-section cut along the width direction perpendicular to the longitudinal direction of the battery cell and battery module is shown. FIG. 4 is an exploded perspective view of a cell stack included in the battery module of FIG. 3. FIG. 5 is an exploded perspective view showing another example of a cell stack.

Referring to FIGS. 3 to 5, the battery module 100 includes a cell stack 110 including a plurality of battery cells 10 as described above and a module housing 120 accommodating the cell stack 110. In particular, it has a configuration in which the resealing portions 50 of the battery cells 10 are distributed and stacked within the cell stack 110.

A plurality of battery cells 10 are stacked in the vertical direction (Z-axis direction in the drawing) with the receiving portions R facing each other to form the cell stack 110. The up and down direction may also be referred to as the vertical direction or the Z-axis direction. In the present disclosure, the resealing portions 50 of all battery cells 10 are stacked so as not to face in any one direction. For example, the resealing portions 50 are disposed in both directions in the width direction within the cell stack 110. For example, along the Z-axis direction, the resealing portions 50 are stacked in a zigzag manner so that one resealing portion 50 is placed on the left and the other resealing portion 50 is placed on the right. Accordingly, the first edge portion E1 including the resealing portion 50 and the second edge portion E2 not including the resealing portion 50 are alternately positioned along the vertical direction on both sides of the cell stack 110. The second edge portion E2 includes a sealing portion 40 or an unsealed portion, as mentioned above.

In this case, as shown in FIG. 4, one first edge portion E1 including the resealing portion 50 and one second edge portion E2 not including the resealing portion 50 may be alternately positioned along the vertical direction on both sides of the cell stack 110, or as shown in FIG. 5, several first edge portions E1 including the resealing portion 50 and several second edge portions E2 not including the resealing portion 50 may also be alternately positioned. For example, as shown in FIG. 5, two or more may be alternately positioned.

In any case, preferably, the plurality of battery cells 10 are alternately stacked by distributing approximately half of the resealing portions 50 (positioned on both sides in the width direction) toward the left wall and the right wall, respectively, within the module housing 120. Through this, the pressure and temperature concentrated on both walls of the module housing 120 within the cell stack 110 may be significantly lowered. For example, if the number of battery cells 10 is 2n, n battery cells 10 have their resealing portions 50 placed toward the left wall, and the remaining n battery cells 10 have their resealing portions 50 placed toward the right wall. If the number of battery cells 10 is 2n+1, n or n+1 battery cells 10 have their resealing portions 50 placed toward the left wall, and the remaining n+1 or n battery cells 10 have their resealing portions 50 placed toward the right wall.

In this way, even if the first edge portion E1 and the second edge portion E2 are alternately and repeatedly stacked along the vertical direction, vertical alignments between the third edge portions E3, between the fourth edge portions E4, and between the third edge portion E3 and the fourth edge portion E4 are made at the front and rear sides, and thus the electrode leads 30 may be stacked while being aligned in the vertical direction in a row at the front and rear sides of the cell stack 110. It will be obviously appreciated that the polarities of the electrode leads 30 placed in the front may all be the same, or the opposite polarities may be placed along the vertical direction. In addition, it will be appreciated that some battery cells 10 may be stacked upside down, considering the polarity of the electrode lead 30 and the arrangement of the resealing portion 50.

The module housing 120 shown in FIG. 3 has an internal space for accommodating the battery cells 10 therein, and serves to provide mechanical support for the accommodated battery cells 10 and to protect them from external impacts. Looking at FIG. 3 in more detail, the module housing 120 includes a pair of side plates 130 located on both sides of the cell stack 110. The module housing 120 may also further include a top plate 140 covering the upper portion of the cell stack 110 and a base plate 150 supporting the cell stack 110.

The side plate 130 and the cell stack 110 may be spaced apart to form a space portion S. This space portion S may be configured to trap flares and sparks ejected during swelling. For example, a pair of side plates 130 may be spaced apart and facing each other at a distance slightly larger than the width W of the cell stack 110 to form the space portion S.

In addition, the battery module 100 may further include a PC sheet 160 and a mica sheet 170. The PC sheet 160 and the mica sheet 170 may be included between the module housing 120 and the side of the cell stack 110. In particular, in this embodiment, they are included between the side plate 130 and the side of the cell stack 110. The PC sheet 160 and the mica sheet 170 may be located on both sides of the cell stack 110. The mica sheet 170 has excellent heat resistance to withstand high-temperature vent gas and sparks. The PC sheet 160 and the mica sheet 170 are ductile or easy to change shape, and when flames occur in any one battery cell 10, they may block the propagation of flames or heat by flames to other battery cells 10 or the side plate 130.

The first edge portion E1 of approximately half of the plurality of battery cells 10 included in the cell stack 110 faces the left side plate 130a, which is one of the side plates 130, and the first edge portion E1 of the remaining battery cells 10 faces the right side plate 130b, which is the other of the side plates 130. Through this, the pressure and temperature concentrated on both side plates 130a, 130b when venting through the resealing portion 50 within the cell stack 110 may be distributed evenly to both sides, and the temperature of the side plate facing the resealing portion 50 may be significantly lowered compared to the case where it is tilted to one side.

Figure 6:
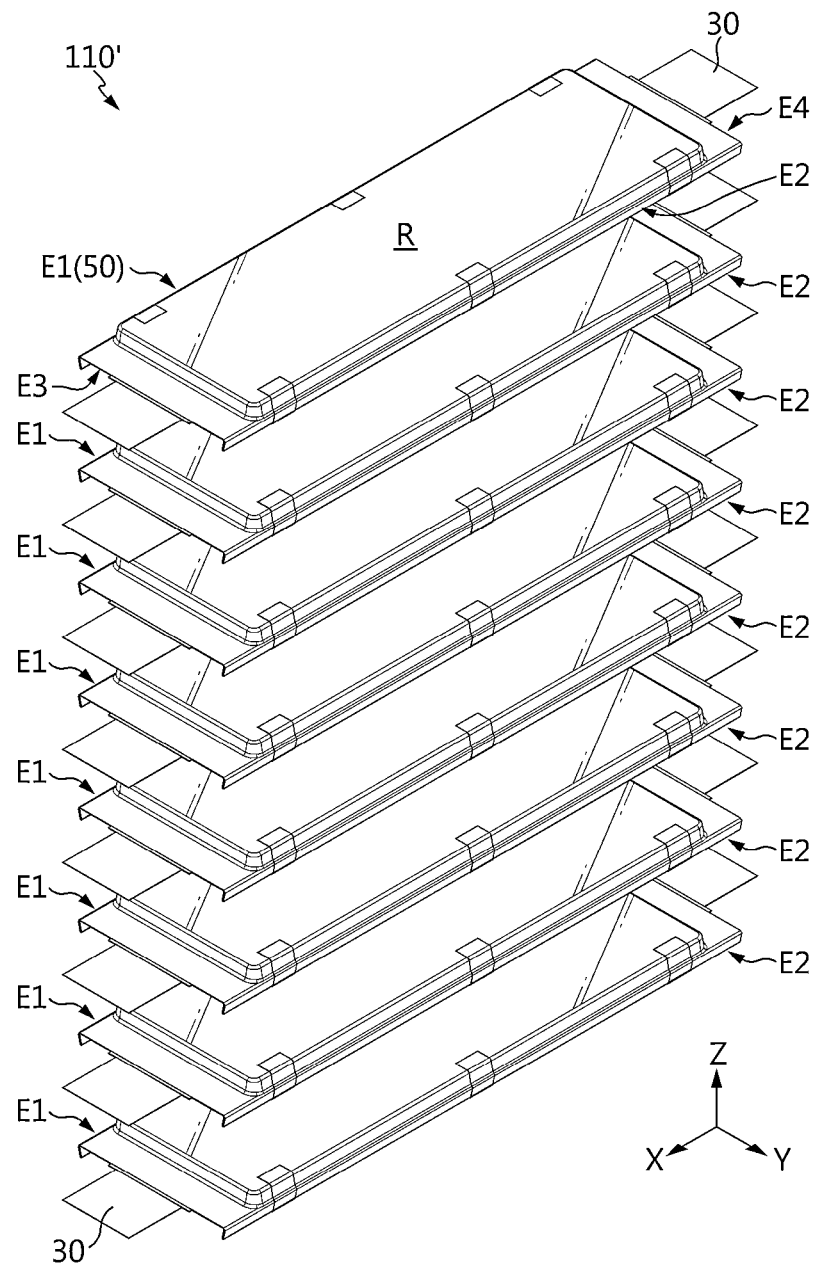
FIG. 6 is an exploded perspective view of a cell stack according to a comparative example.

As a comparative example, FIG. 6 illustrates a cell stack 110' in which the resealing portion 50 is disposed in only one direction, for example, to the left. In this cell stack 110', all eight resealing portions 50 are configured as battery modules while facing one wall of the module housing. In this way, if the resealing portions 50 are tilted to one side, they may be exposed to high temperature and high pressure for a short period of time, which may lead to a gas explosion. This is because if the vulnerable resealing portions 50 are gathered on one side, the temperature rise is maximized, resulting in auto ignition in which they meet flammable and explosive vent gas and explode.

Since the resealing portion 50 is formed by resealing after a degassing process, it is more vulnerable than the sealing portion 40 or the unsealed portion on the opposite side and thus may be torn first in the event of thermal runaway. If these resealing portions 50 are concentrated on one side as in the comparative example, the module housing may melt if it is an aluminum enclosure, and the module housing may not melt, but the temperature of the outer wall thereof becomes high up to 800° C. or higher if it is made of steel. If the temperature exceeds 505° C., auto ignition in which the hydrogen in the vent gas flowing around it may mix with oxygen and explode occurs. For this reason, the battery module including the cell stack 110' of the comparative example is inevitably vulnerable to fire.

On the other hand, in the cell stack 110 included in the battery module 100 of the present disclosure, the arrangement of the resealing portion 50 is adjusted to prevent auto ignition. In the present disclosure, when stacking the battery cells 10 to make a battery module 100, a battery pack including such a battery module 100, and the like, that is, when manufacturing the cell stack 110, the resealing portions 50 are stacked in a zigzag manner to prevent the resealing portions 50 from being tilted in either direction. Zigzag stacking allows the resealing portions 50 to be disposed in both directions side by side facing each other. The resealing portion 50 located in both directions opens before the sealing portion 40 or the unsealed portion, and since the resealing portion 50 is disposed in both directions, a two-way directional venting may be possible. In addition, heat energy may be dispersed in both directions. Through this, a large amount of sparks and high-temperature, high-pressure flares emitted from thermal runaway of the battery cell 10 may be dispersed to lower the pressure and keep the temperature of the outer wall of the module housing 120 below 500° C. Therefore, it is possible to block auto ignition and explosion generated by contact with hydrogen and oxygen in the surrounding vent gas.

Meanwhile, although FIG. 3 shows that the base plate 150, the top plate 140, and the pair of side plates 130 are all manufactured separately and then combined, it is also possible to manufacture the base plate 150 and the pair of side plates 130, or the top plate 140 and the pair of side plates 130 as one piece and then assemble them. The base plate 150, the top plate 140, and the pair of side plates 130 may all be made of the same material. In addition, FIG. 3 schematically shows the shapes of the base plate 150, the top plate 140, and the pair of side plates 130. The effect of the distributed arrangement of the resealing portion 50 may be maximized in combination with various embodiments of the module housing 120 to be described below.

Figure 7:
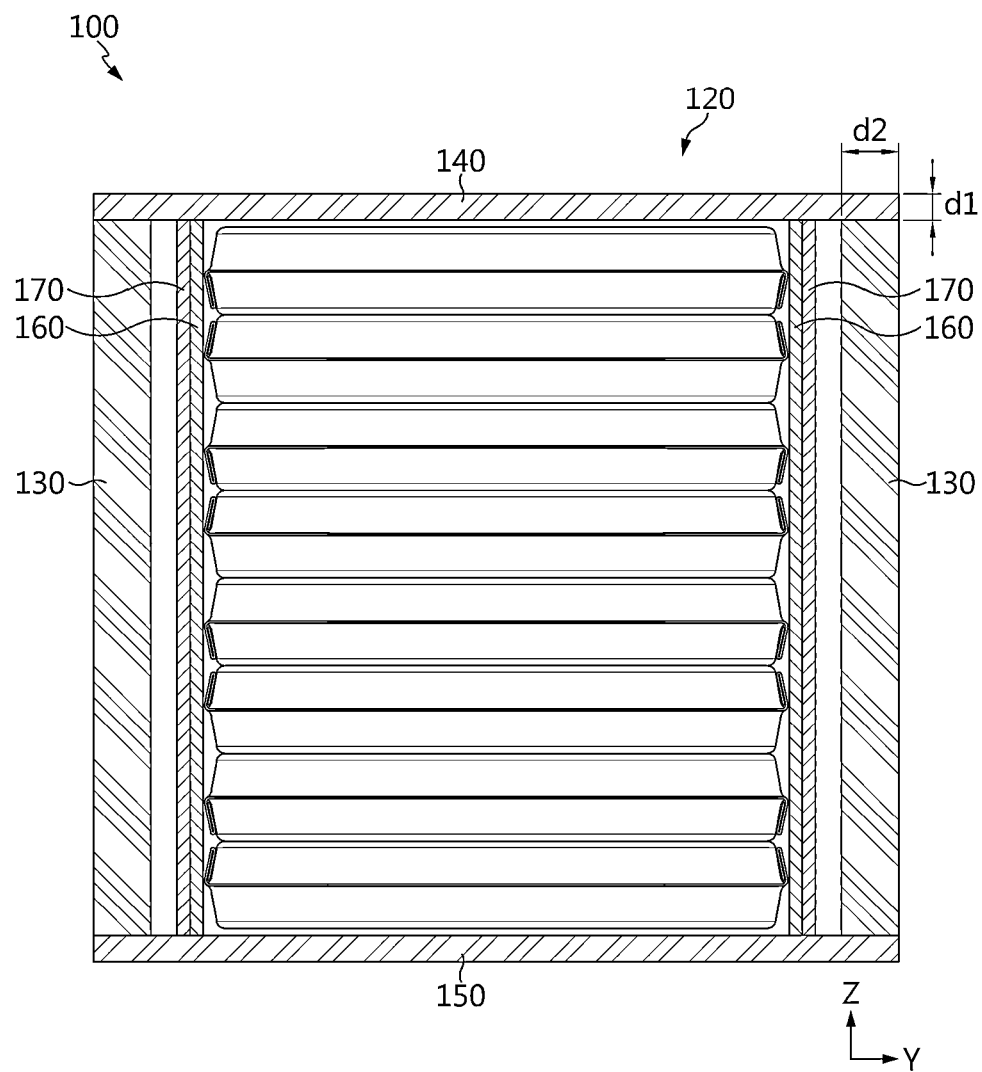
FIGS. 7 to 10 are views according to a modified example of the battery module shown in FIG. 3.

FIG. 7 is a modified example of the battery module 100 shown in FIG. 3 and includes an improved module housing 120. In this embodiment, the thickness d2 of the side plate 130 is thicker than the thickness d1 of the top plate 140 (d1<d2).

Due to the structure of the cell stack 110, the vent gas discharged from the resealing portion 50 first hits the side plate 130. The change in the amount of heat in the side plate 130 due to the vent gas is Qin (the amount of heat entering the side plate 130)−Qout (the amount of heat leaving the side plate 130), which can be said to be equal to Cp×M×ΔT. Here, Cp is the specific heat of the side plate 130, M is the mass of the side plate 130, and ΔT is the changed temperature. When Qin−Qout is constant, ΔT can be made smaller by increasing M. In other words, if the thickness d2 of the side plate 130 is increased, M may be increased to reduce the temperature change. However, it is not desirable to indiscriminately increase the thickness d2 of the side plate 130 because it causes an increase in material costs and an increase in the weight of the entire battery module 100. The thickness d2 of the side plate 130 is increased within an appropriate budget. For example, if the thickness of the module housing 120 currently in use is 1.6 mm, the thickness d2 of the side plate 130 is set to be thicker, such as 1.8 mm. In addition, in order to maintain the overall material cost and weight, the top plate 140 may be configured to have a reduced thickness d1 as the thickness d2 of the side plate 130 is increased. As such, in the battery module 100 of FIG. 7, the thickness d2 of the side plate 130 is greater than the thickness d1 of the top plate 140. For example, the thickness d1 of the top plate 140 is 1.6 mm, the thickness d2 of the side plate 130 is 1.8 mm, and so on.

The thickness d1 of the top plate 140 and the thickness d2 of the side plate 130 may be determined by considering various conditions such as material cost, weight, fire prevention, and durability, and may also be determined by considering factors such as thermal stress or thermal strain caused by the difference in thickness if the top plate 140 and the side plate 130 are made of the same material. For example, the thickness d2 of the side plate 130 may be determined to be in the range of 5% to 50% thicker than the thickness d1 of the top plate 140.

By increasing the thickness d2 of the side plate 130 in this way to increase the M of the side plate 130, the temperature of the side plate 130 may be managed to be 500° C. or less even if vent gas is discharged through the resealing portion 50. Therefore, it is possible to effectively prevent auto ignition generated by contact with hydrogen and oxygen in the surrounding vent gas.

Figure 8:
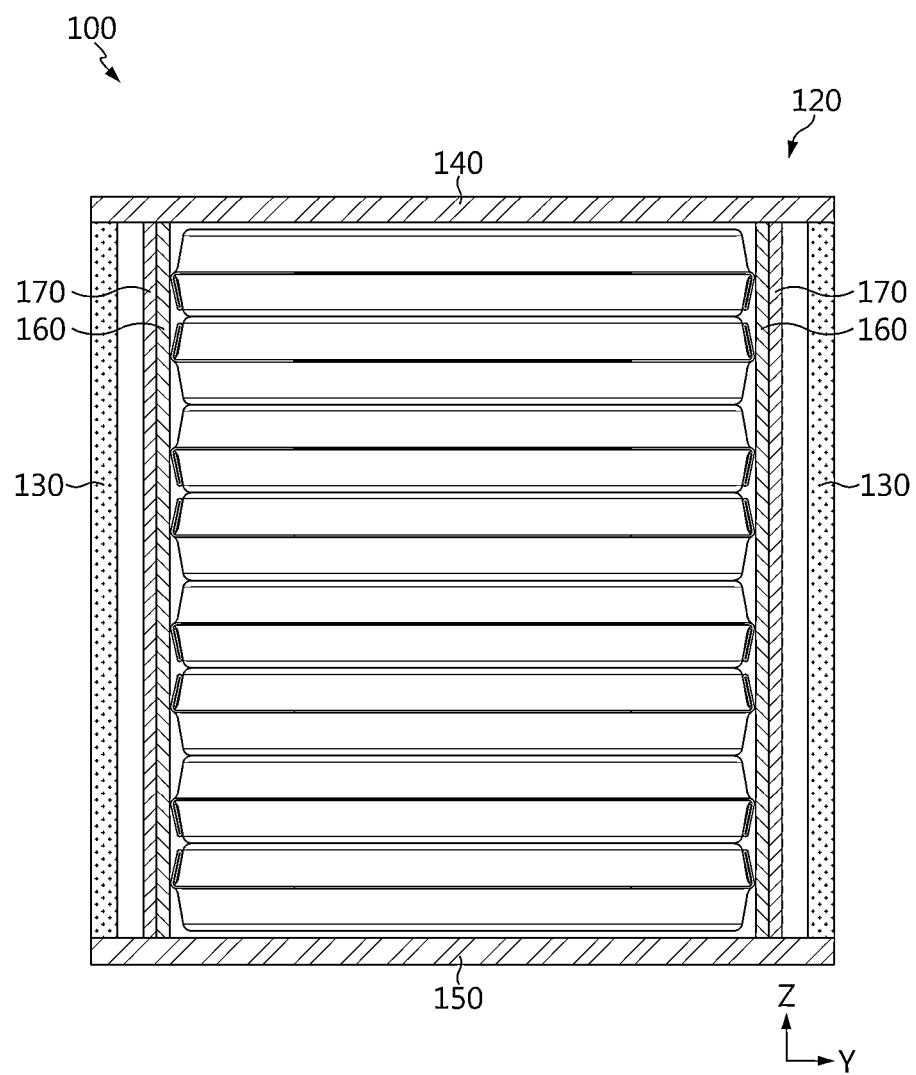

FIG. 8 is another modified example of the battery module 100 shown in FIG. 3 and also includes an improved module housing 120. In this embodiment, the side plate 130 is made of a material whose specific heat is higher than that of the top plate 140. That is, the material of the top plate 140 and the material of the side plate 130 are different, and the side plate 130 has a higher specific heat.

As previously mentioned, due to the structure of the cell stack 110, the vent gas discharged from the resealing portion 50 first hits the side plate 130. In the change in the amount of heat in the side plate 130 due to the vent gas Qin−Qout=Cp×M×ΔT, when Qin−Qout is constant, ΔT can be made smaller by increasing Cp. In other words, the temperature change may be reduced by increasing the specific heat of the side plate 130. However, it is not desirable to indiscriminately increase the specific heat of the side plate 130 because of the increase in material costs and difficulty in selecting an appropriate material. The specific heat of the side plate 130 is increased within an appropriate budget. For example, if the module housing 120 currently in use is made of a material with a specific heat of 0.461 (J/gC), the specific heat of the side plate 130 is set to be 0.48 to 0.5 (J/gC), which is greater than that.

In addition, if the alloy cost for increasing the specific heat is expensive, the specific heat of the top plate 140 may be reduced as much as the specific heat of the side plate 130 is increased in order to maintain the overall material cost. As such, in the battery module 100 of FIG. 8, the specific heat of the side plate 130 is configured to be greater than the specific heat of the top plate 140. For example, the specific heat of the side plate 130 may be increased by configuring the top plate 140 to be made of galvanized steel and the side plate 130 to further include metals such as aluminum, titanium, magnesium, and silicon, which have higher specific heat than zinc or iron, in the form of alloy or plating.

By increasing the specific heat of the side plate 130 in this way, Qin−Qout, which is a change in the amount of heat of the side plate 130, may be managed to reduce ΔT, thereby managing the temperature of the side plate 130 to be 500° C. or less even if vent gas is discharged through the resealing portion 50. Therefore, it is possible to effectively prevent auto ignition generated by contact with hydrogen and oxygen in the surrounding vent gas.

Figure 9:
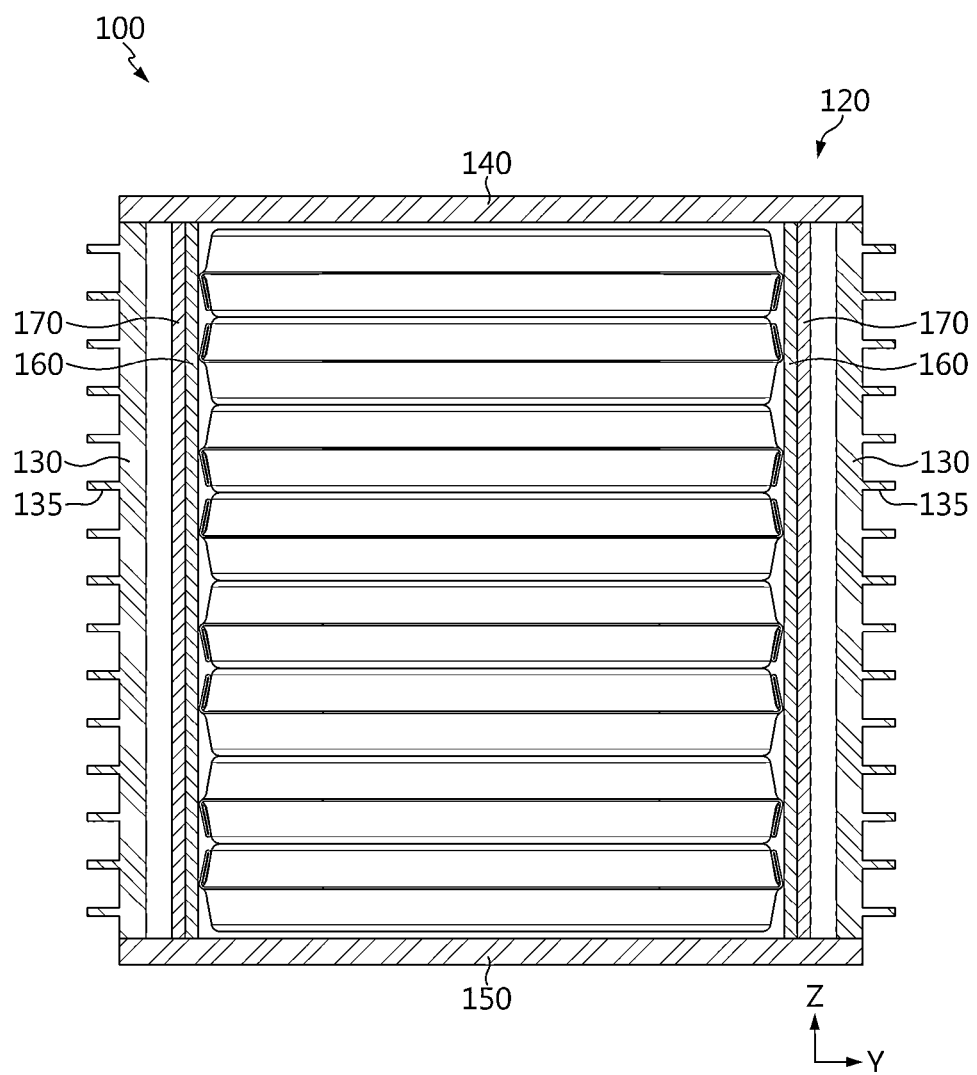

FIG. 9 is still another modified example of the battery module 100 shown in FIG. 3 and includes an improved module housing 120. In this embodiment, heat dissipation fins 135 are formed on the outer side of the side plate 130.

It has been emphasized several times that due to the structure of the cell stack 110, the vent gas discharged from the resealing portion 50 first hits the side plate 130. In this embodiment, by including the heat dissipation fins 135 in the side plate 130, heat may be dissipated to the outside without being accumulated in the side plate 130. The heat dissipation fin 135 is configured to maximize the surface area for effective heat dissipation. Through this, even if vent gas is discharged through the resealing portion 50, the temperature of the side plate 130 may be managed to be 500° C. or less, thereby effectively preventing auto ignition.

Figure 10:
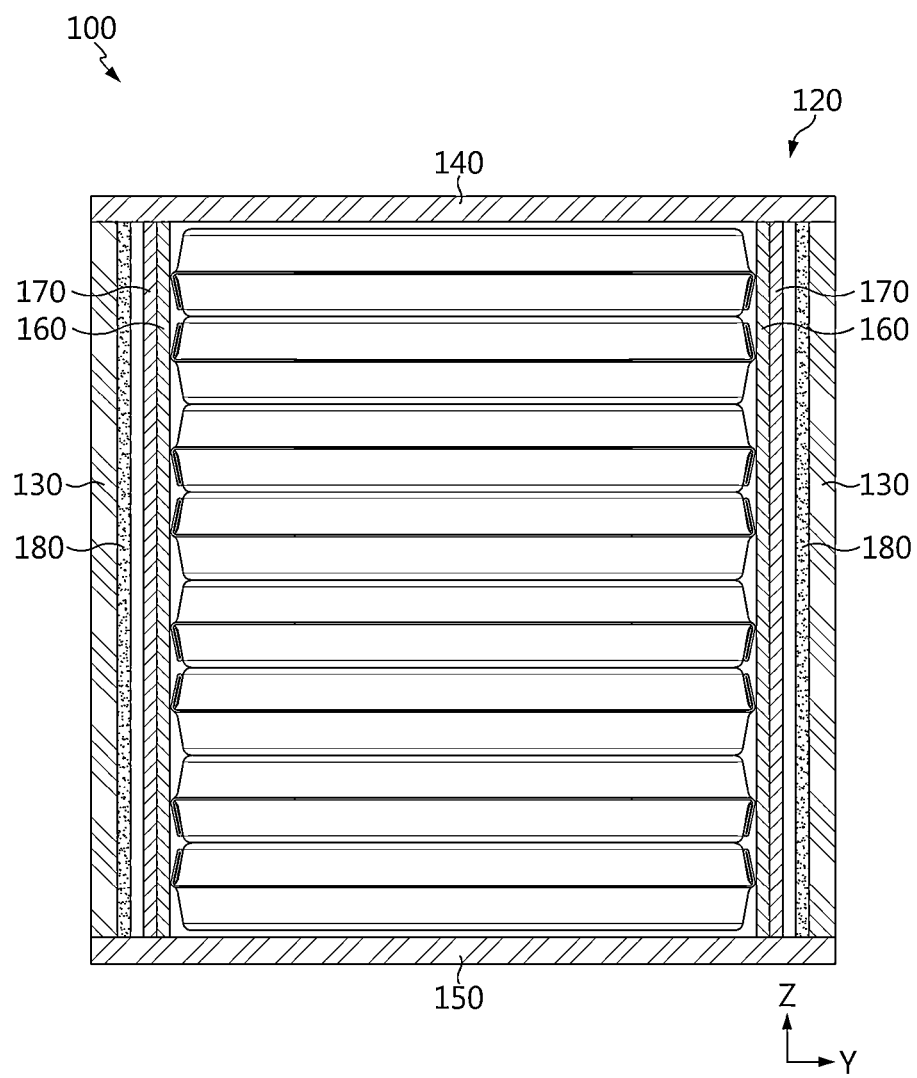

FIG. 10 is still another modified example of the battery module 100 shown in FIG. 3, and in this embodiment, a thermal spreader 180 is further included between the side plate 130 and the side of the cell stack 110.

Here, the thermal spreader 180 refers to an object that absorbs and dissipates heat from another object through direct thermal contact. The thermal spreader 180 may have a material and structure specialized for the conduction and radiation of heat, so that it may take heat from the heat-generating battery cell 10 and release it to the surroundings. For example, the thermal spreader 180 may be a member that is attached to the inside of the side plate 130, spreads and releases heat generated in the battery cell 10. The thermal spreader 180 may include silicon, acrylic, or graphite.

In addition to the thermal spreader 180, the battery module 100 may further include a thermal interface material (TIM) layer to increase heat transfer performance between different components. The TIM layer is intended to reduce contact thermal resistance between members. This TIM layer may include various thermally conductive materials such as metal, polymer, or ceramic, and may be composed of a gel type or a phase change material. For example, the TIM layer may be a thermally conductive resin called a thermal resin.

By including the thermal spreader 180, heat may be dissipated to the outside rather than being accumulated in the side plate 130. According to this embodiment of the present disclosure, the heat dissipation performance of the battery cell 10 may be further improved. Through this, even if vent gas is discharged through the resealing portion 50, the temperature of the side plate 130 may be managed to be 500° C. or less, thereby effectively preventing auto ignition.

Meanwhile, the effect of the distributed arrangement of the resealing portion 50 according to the present disclosure may be further maximized in a battery module having a spark pocket structure to be described next.

Figure 11:
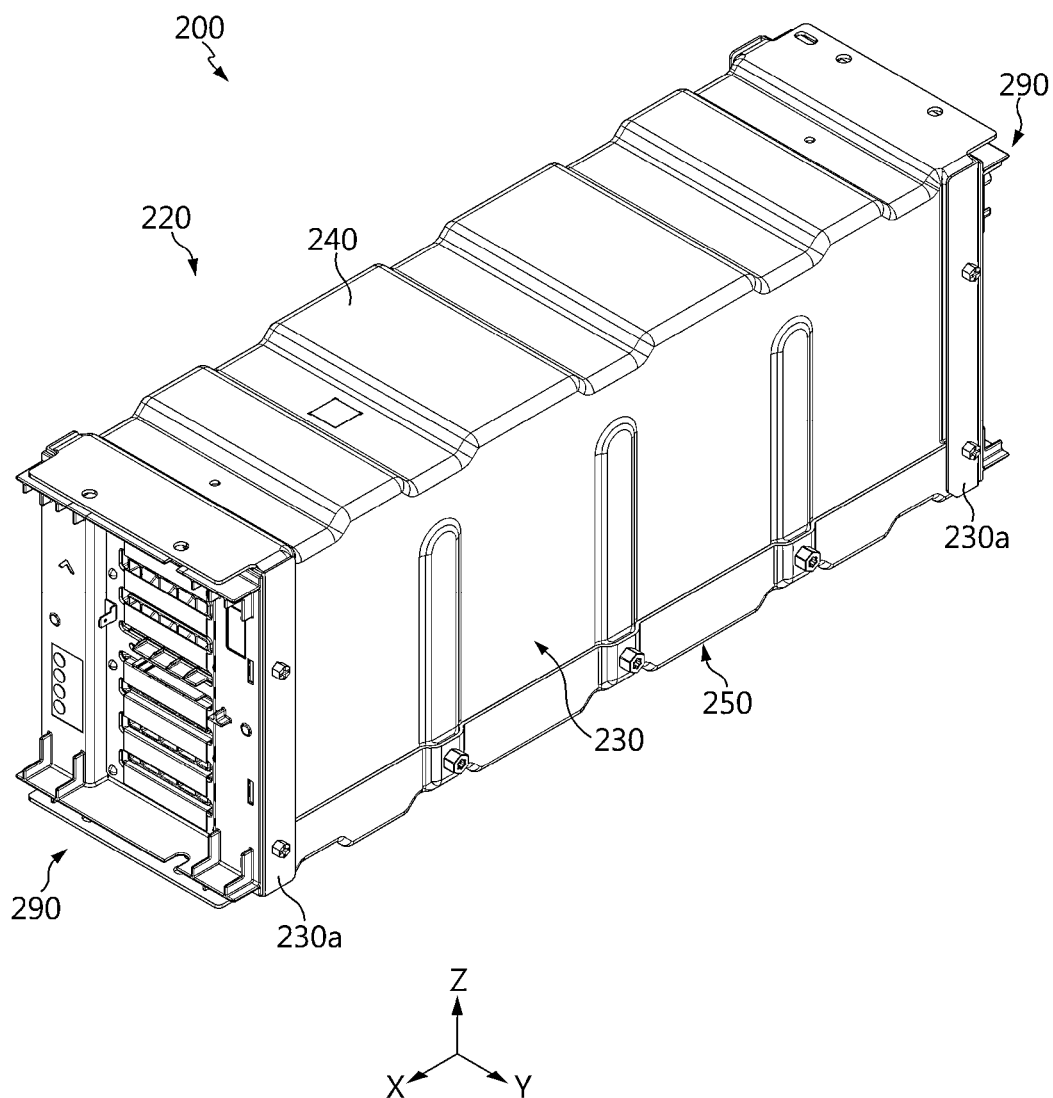
FIG. 11 is a perspective view of a battery module according to another embodiment of the present disclosure.

FIG. 11 is a perspective view of a battery module according to another embodiment of the present disclosure.

Referring to FIG. 11, the battery module 200 according to another embodiment of the present disclosure has an exterior shape of a substantially rectangular parallelepiped and includes a module housing 220 made of a metal material. These battery modules 200 are formed in a substantially rectangular parallelepiped state and may be arranged in an orderly manner without wasted space in the pack case.

Figure 12:
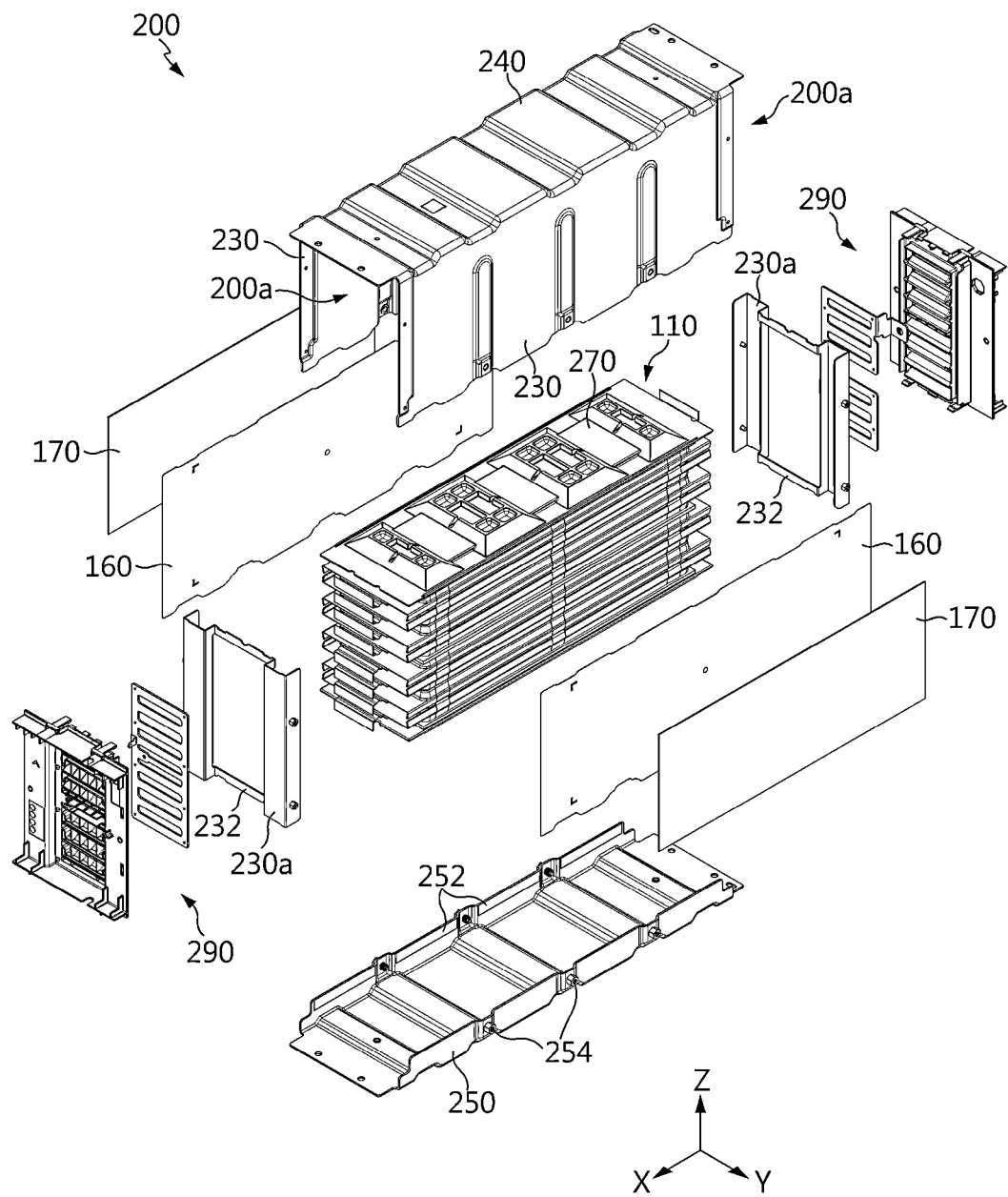
FIG. 12 is an exploded perspective view of the battery module shown in FIG. 11.
Figure 13:
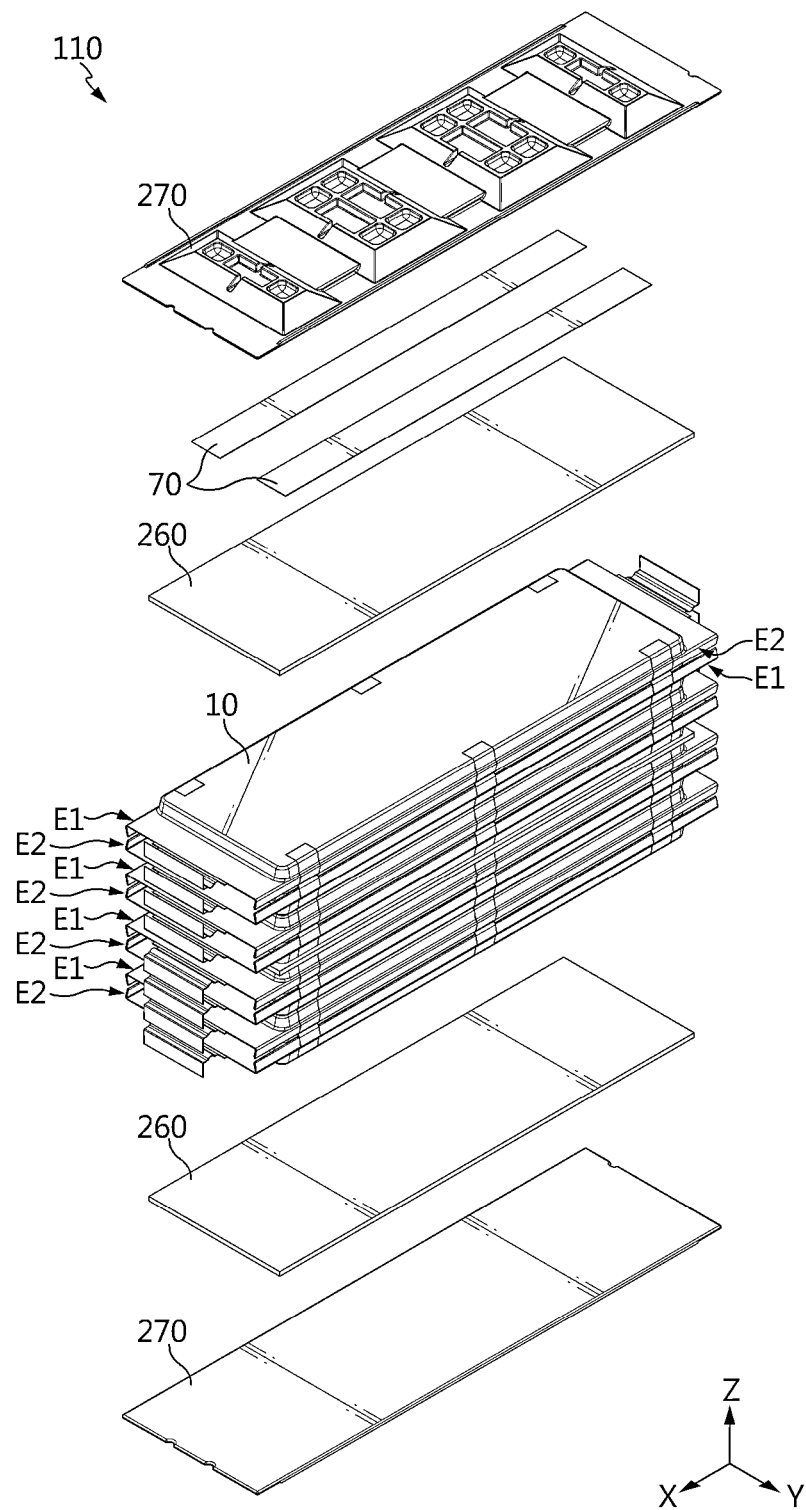
FIG. 13 is an exploded perspective view of a cell stack included in the battery module of FIG. 11.

FIG. 12 is an exploded perspective view of the battery module shown in FIG. 11, and FIG. 13 is an exploded perspective view of a cell stack included in the battery module of FIG. 11.

Referring to FIGS. 11 to 13, the cell stack 110 is accommodated within the module housing 220, and the specific description of the cell stack 110 is almost the same as described in the previous embodiment.

A plurality of battery cells 10 may be stacked face to face. If the surface of the pouch exterior material 20 is slippery, the plurality of battery cells 10 tend to slide easily due to external impact when stacking the plurality of battery cells 10. Therefore, in order to prevent this and maintain a stable stacked structure of the battery cells 10, an adhesive member 70 such as a sticky adhesive such as a double-sided tape or a chemical adhesive bonded by a chemical reaction during adhesion may be attached to the surface of the pouch exterior material 20 to form the cell stack 110.

In addition, the battery module 200 may further include a buffer pad 260 located on at least one of the upper portion and lower portion of the cell stack 110.

One or more buffer pads 260 are located on at least one of the upper portion and lower portion of the stacked battery cells 10, and may be interposed between the battery cells 10, if necessary. This buffer pad 260 is made of a material whose volume easily changes depending on external pressing force, for example, a sponge or a non-woven fabric.

Furthermore, an insulating plate 270 located on at least one of the upper portion and lower portion of the cell stack 110 may be further included.

The insulating plate 270 is located on at least one of the upper portion and lower portion of the stacked battery cells 10, and of course on the outer side the buffer pad 260, when the buffer pad 260 is mounted, thereby being directed to pressurizing all the surfaces of the battery cells 10 uniformly and at the same time preventing electricity from flowing between the metal module housing 220 and the battery cells 10. The insulating plate 270 is preferably made of plastic for light weight and insulation of the battery module 200.

As shown in FIGS. 11 and 12, the module housing 220 is configured to include a pair of side plates 230 located on both sides of the cell stack 110, a top plate 240 covering the upper portion of the cell stack 110, and a base plate 250 supporting the cell stack 110.

The battery module 200 may further include a PC sheet 160 and a mica sheet 170 between the side plate 230 and the side of the cell stack 110, as described above.

The base plate 250 is a U-frame structure capable of wrapping and fixing the lower end of the side plate 230 from the outside. The base plate 250 may be made into a U-frame structure by bending both ends of one plate. The bending configuration may be implemented in various ways, such as pressing or roll forming.

The top plate 240 and the side plate 230 may be connected to each other to form a U-frame structure. The top plate 240 and the side plate 230 may be made into a U-frame structure by any one of welding, bonding, fitting, hooking, or bolting their separate structures. Instead, like the method of making the base plate 250, the top plate 240 and the side plate 230 may be made by bending both ends of one plate. In this case, the side plate 230 may be configured to extend downward from both ends of the top plate 240.

The battery module 200 has a module opening 200a formed on one side in the longitudinal direction. The module opening 200a may also be formed on the other side of the battery module 200 in the longitudinal direction. The vent gas generated inside the battery module 200 may be discharged through the module opening 200a. In this embodiment, the module openings 200a are formed at the front and rear ends of the battery cell 10 in the longitudinal direction, respectively.

The battery module 200 may further include a busbar frame assembly 290 that covers the module opening 200a formed on one side of the module housing 220 in the longitudinal direction.

The pair of side plates 230 may have a spark direction switching portion 230a formed by bending one end in the longitudinal direction toward the cell stack 110.

The module opening 200a formed on one side of the module housing 220 in the longitudinal direction is formed between a pair of spark direction switching portions 230a provided on each of the pair of side plates 230. The electrode lead 30 of the battery cell 10 may be exposed to the outside of the module housing 220 through the module opening 200a formed between a pair of spark direction switching portions 230a.

Figure 14:
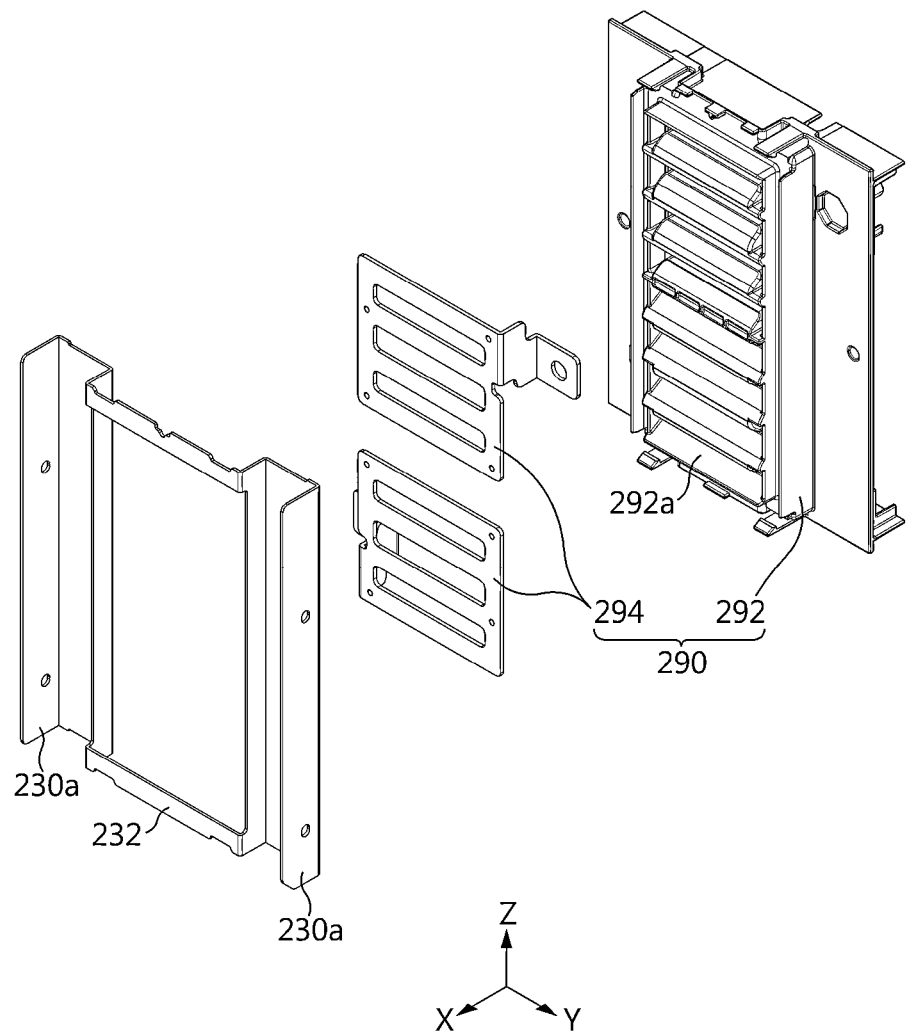
FIG. 14 is an exploded perspective view of some components located on the rear side of the battery module of FIG. 11.
Figure 15:
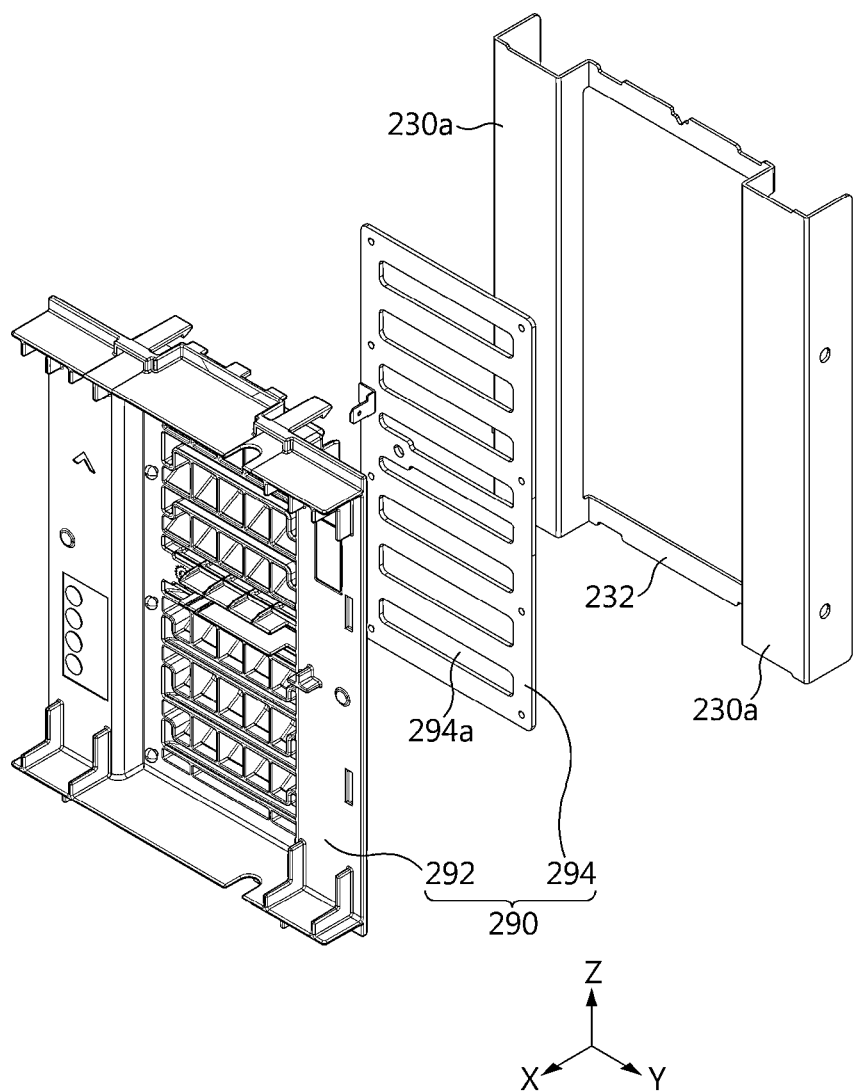
FIG. 15 is an exploded perspective view of some components located on the front side of the battery module of FIG. 11.

FIG. 14 is an exploded perspective view of some components located on the rear side of the battery module of FIG. 11. FIG. 15 is an exploded perspective view of some components located on the front side of the battery module of FIG. 11.

Referring to FIGS. 14 and 15, the module housing 220 may further include a fastening frame 232 that connects a pair of spark direction switching portions 230a and has an empty center thereof.

The module opening 200a provided in the module housing 220 of the present disclosure may be formed on both sides of the module housing 220 in the longitudinal direction. In this case, the pair of spark direction switching portions 230a may also be provided on both one side and the other side of the module housing 220 in the longitudinal direction.

The busbar frame assembly 290 includes a busbar frame 292 and at least one busbar 294. The busbar frame assembly 290 may be provided in a pair, in which case, each of the pair of busbar frame assemblies 290 covers a module opening 200a formed on one side in the longitudinal direction of the module housing 220 and a module opening 200a formed on the other side.

The busbar frame 292 covers the module opening 200a formed in the module housing 220, has a plurality of frame slits 292a through which the electrode leads 30 of the battery cell 10 passes, and is made of an insulating material.

The busbar frame 292 has a shape corresponding to one end and/or the other end in the longitudinal direction of the module housing 220 and is in close contact with the module housing 220. When the module housing 220 is provided with the fastening frame 232 as described above, the busbar frame 292 is in close contact with the spark direction switching portion 230a and the fastening frame 232.

The busbar 294 is disposed on the outer surface of the busbar frame 292 and is coupled to the electrode lead 30 passing through the frame slit 292a, thereby electrically connecting the plurality of battery cells 10. The busbar 294 has a busbar slit 294a through which the electrode lead 30 passes, and may be made of a metal material having a flat plate shape. In this case, the busbar slit 294a and the frame slit 292a may be formed at positions corresponding to each other.

The spark direction switching portion 230a and the fastening frame 232 may be deformed to trap flares, sparks, and the like. In this case, it is obvious that the busbar frame 292 may also be changed to correspond to the modified appearance.

Figure 16:
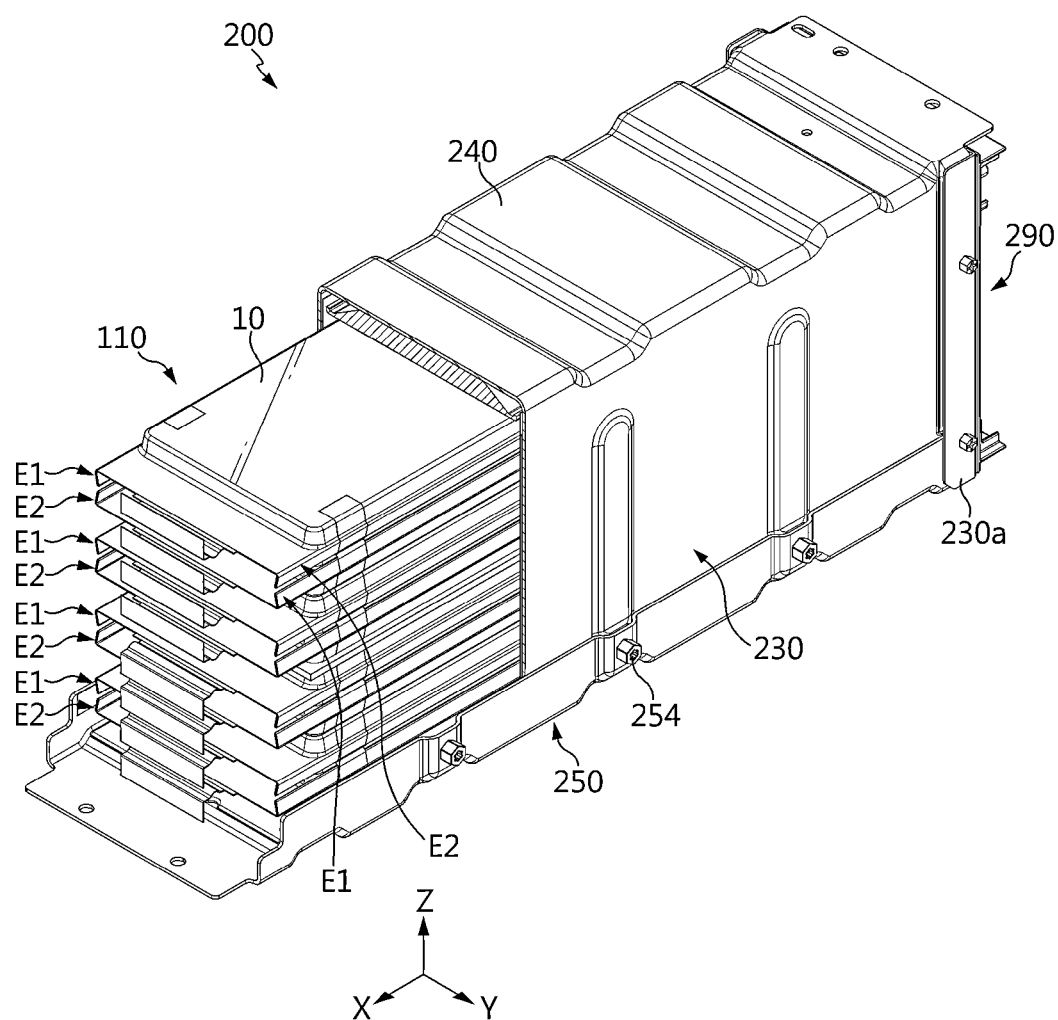
FIG. 16 is a partially cutaway perspective view of the battery module of FIG. 11.
Figure 17:
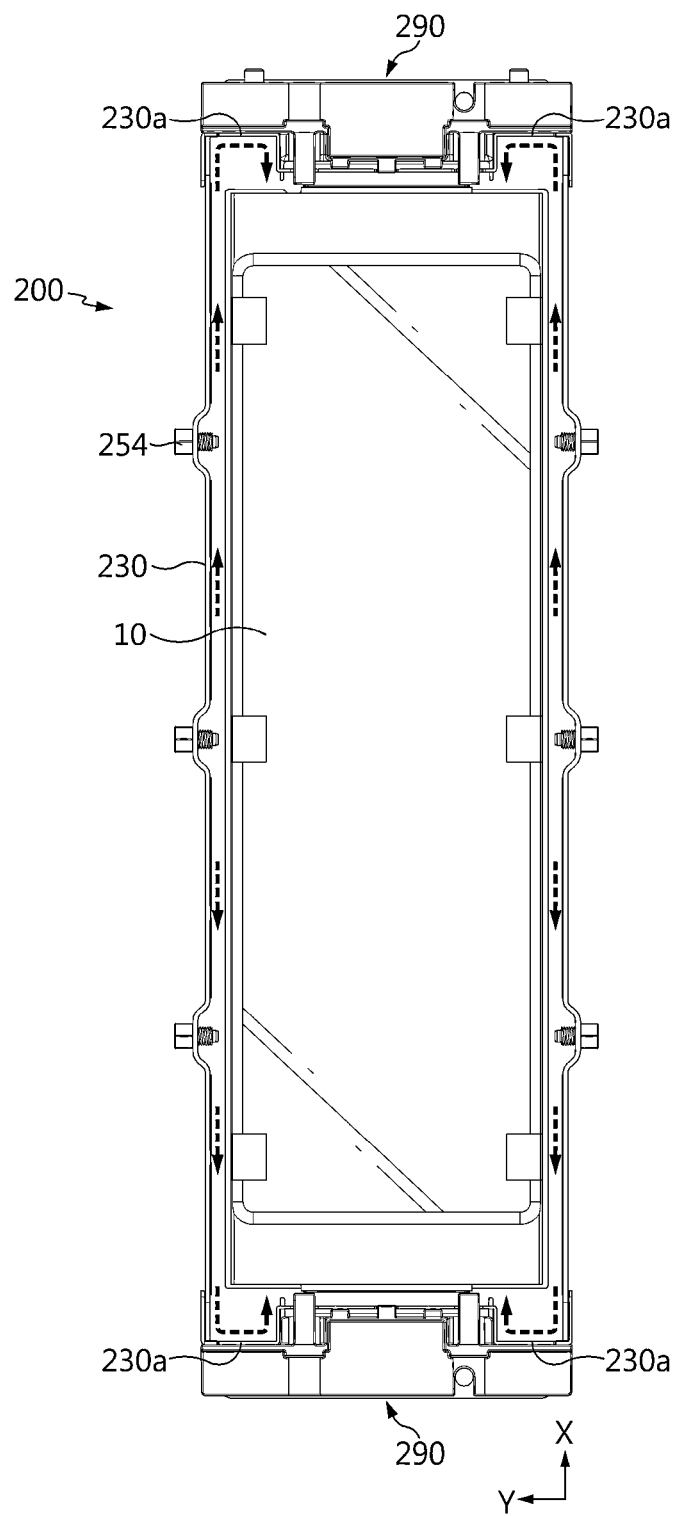
FIG. 17 is a cross-sectional view parallel to the longitudinal direction of the battery module of FIG. 11.

FIG. 16 is a partially cutaway perspective view of the battery module of FIG. 11, and FIG. 17 is a cross-sectional view parallel to the longitudinal direction of the battery module of FIG. 11.

Referring to FIGS. 11 to 17, when describing the assembly process of the battery module 200 including the above-described configuration, an insulating plate 270, a buffer pad 260, a plurality of battery cells 10, a buffer pad 260, and an insulating plate 270 are stacked in that order to prepare the cell stack 110, and the electrode leads 30 of the battery cells 10 pass through the frame slit 292a of the busbar frame 292. At this time, it should be noted that the resealing portions 50 of the battery cells 10 are distributed at left and right sides as described above. Thereafter, the electrode leads 30 are passed through the busbar slit 294a of the busbar 294, bent, and fixed through a known bonding means such as welding.

The cell stack 110 prepared in this way is accommodated in a form surrounded by a base plate 250, a top plate 240, and a pair of side plates 230. At this time, the top plate 240 and the pair of side plates 230 are combined to form a U-frame structure, and this U-frame surrounds both sides and the top surface of the cell stack 110, and the front, rear, and bottom surface become open while accommodating the cell stack 110.

The base plate 250 is coupled to the U-frame so as to surround the lower end of the side plate 230 from the outside. The coupling may be welded, but in this embodiment, a tape 252 and a bolt 254 coupling are illustrated.

The busbar frame 292 is in close contact with the spark direction switching portion 230a and the fastening frame 232, and the busbar frame 292 serves to cover the module opening 200a of the module housing 220.

In particular, the movement path of the venting gas and spark in the battery module 200 may be described with reference to FIG. 17.

Referring to FIG. 17, the battery module 200 of the present disclosure includes a spark direction switching portion 230a as described above, so that high-temperature sparks emitted during venting of the battery cell 10 may not be ejected to the outside of the module housing 220 along the longitudinal direction of the module housing 220. That is, when the battery cell 10 is vented, the high-temperature sparks ejected through both sides in the width direction of each battery cell 10 forming the cell stack 110, that is, through the alternately arranged resealing portions 50 move toward one end and/or the other end in the longitudinal direction of the battery module 200, and then the direction of movement is switched to a direction toward the cell stack 110 (see the direction of the dotted arrow shown in FIG. 17). Furthermore, since flares and sparks are trapped in the space by the spark direction switching portion 230a, they cannot be released to the outside, and their movement may also be restricted in the direction where the electrode leads 30 are located, thereby blocking direct contact with the electrode leads 30. In this way, the spark direction switching portion 230a implements a spark pocket structure.

When thermal runaway occurs in a specific battery cell, flares, sparks, high-pressure vent gas, and hot heat are ejected, and the coexistence of these with oxygen and combustible materials may lead to a fire or explosion. The side plate 230 of the battery module 200 of the present disclosure prevents thermal runaway products such as flares and sparks from protruding out of the module housing 220, and discharges vent gas and heat through the module opening 200a, and in this process, the air filled inside the module housing 220 is discharged together, so that flames cannot be generated.

In the present disclosure, the resealing portion 50 of the battery cell 10 is stacked in a zigzag manner to prevent the resealing portion 50 from being tilted in one direction, so that a large amount of sparks and high-temperature, high-pressure flares emitted from cell thermal runaway may be dispersed, thereby lowering the pressure. Accordingly, there is an effect of blocking auto ignition and explosion generated by contact with hydrogen and oxygen in the surrounding vent gas. In addition, for example, assuming that thermal runaway occurs in a specific battery cell 10 where the resealing portion 50 is disposed on the left side as the first edge portion E1 is placed on the left side in FIGS. 16 and 17, flares or sparks are gathered in a blocked state in the space located on the left side, especially in the space surrounded by the spark direction switching portion 230a on the left side. Therefore, they do not move to the front or rear where the busbar 294 is located, and they also cannot move to the right side of the battery cell 10. On the other hand, since the module housing 220 and the cell stack 110 do not maintain a completely airtight state, the generated vent gas is discharged through the module opening 200a in the vicinity of the busbar frame 292.

As a result, even if a thermal event occurs in any one battery cell, there may be a lack of oxygen required for ignition inside the module housing 220 because the air is discharged to the outside together with the vent gas, and combustible materials may be trapped because they are not discharged to the outside of the module housing 220, and furthermore, hot heat may be discharged together when the air is discharged to maintain below the ignition point, thereby preventing a fire from occurring.

As such, by including the module housing 220 implementing the spark pocket, fire safety of the battery module 200 is increased. Furthermore, according to the distributed arrangement of the resealing portion 50 unique to the present disclosure, if the temperature of the module housing 220 is controlled to a temperature at which auto ignition does not occur, it is possible to prevent an internal transition situation after the occurrence of a thermal runaway from leading to an explosive ignition.

In addition, flames can be blocked entirely in the battery pack including this. The battery modules 100, 200 having the above-described configuration may form one battery pack with or without being accommodated in a separate pack case, and furthermore, the battery module or battery pack may be used in various facilities or devices that include large-capacity power sources, such as ESS, electric vehicles, hybrid vehicles, plug-in hybrid electric vehicles, and the like.

Figure 18:
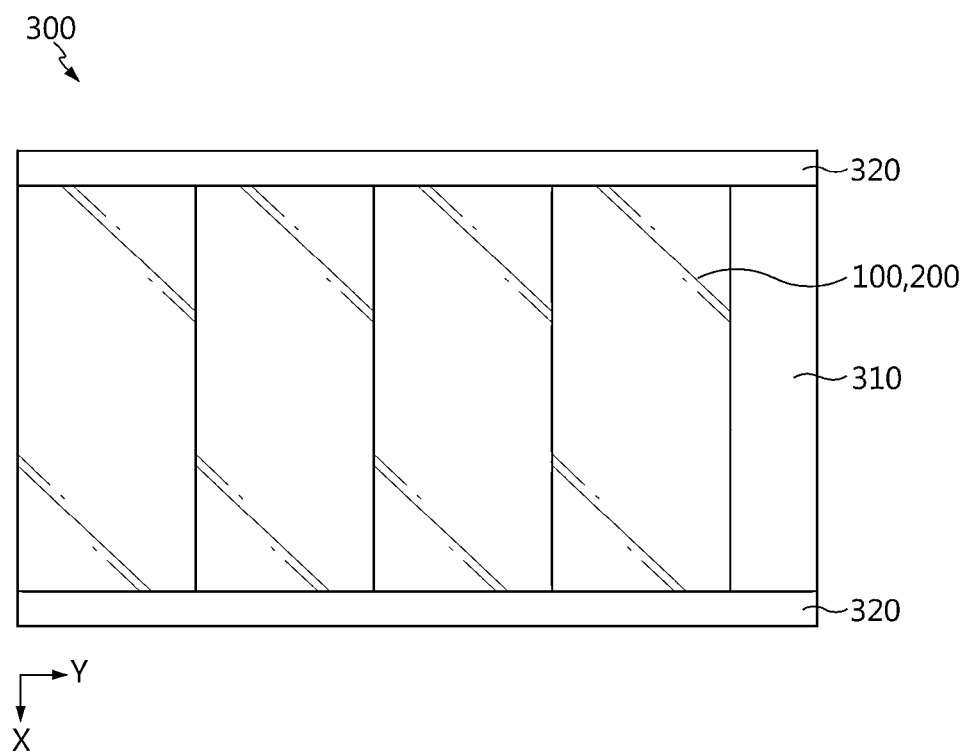
FIG. 18 is a schematic view of a battery pack including a battery module according to an embodiment of the present disclosure.

FIG. 18 is a schematic view of a battery pack including a battery module according to the present disclosure.

As shown in FIG. 18, a plurality of battery modules 100 or 200 may be disposed adjacent to each other along the width direction to form a battery pack 300. The battery pack 300 may further include a BMS assembly 310 coupled to one side of the battery modules 100, 200 in the width direction. The battery pack 300 may also include a duct 320 coupled to one side or both sides of the battery pack 300 in the longitudinal direction. The battery pack 300 may also further include a pack case (not shown) that accommodates these battery modules 100, 200.

The BMS assembly 310 may be coupled to one side in the width direction of a module assembly composed of a plurality of battery modules 100, 200 disposed adjacent to each other. Although not shown in detail in the drawings, the BMS assembly 310 includes at least one battery management system (BMS) that controls charge/discharge of the plurality of battery modules 100, 200. The BMS assembly 310 may also further include a BMS frame coupled to the BMS. The BMS frame may be fastened to the module assembly and/or the duct 320.

The duct 320 is spaced apart in the longitudinal direction of the battery modules 100, 200 so that a pack flow path (not shown) is formed between the battery modules 100, 200 and the duct 320. In particular, in the case of the battery module 200, it is spaced apart from the module opening 200a. The duct 320 has a duct opening formed on one side or both sides in the width direction. The duct opening communicates with the pack flow path. Accordingly, the venting gas discharged to the outside of the battery module 200 along the module opening 200a formed in the battery module 200 moves to one side or both sides in the width direction of the duct 320 along the pack flow path and then is discharged to the outside of the battery pack 300 through the duct opening.

An ESS, which has been attracting attention recently, is a device that can maximize power use efficiency by storing generated electricity in a battery and supplying it to consumers when electricity is needed. In ESS, multiple battery modules form one rack, and dozens to hundreds of racks form one system. And, it is also used in conjunction with uninterruptible power supply (UPS), which ensures stable power supply in response to sudden power supply interruptions or abnormalities, and solar power generation systems, which are power generation devices converting sunlight into electrical energy. The battery modules 100, 200 according to the present disclosure are particularly suitable as battery modules for ESS because they have excellence in preventing ignition.

Figure 19:
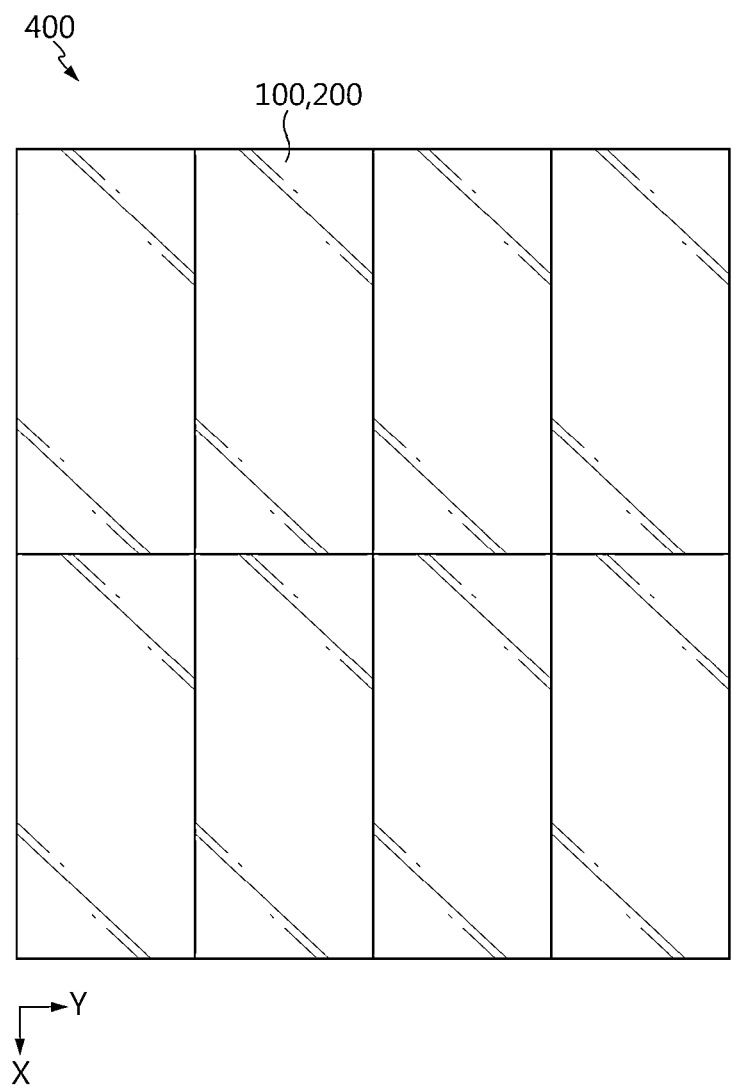
FIG. 19 is a schematic view of an ESS including a battery module according to an embodiment of the present disclosure.

FIG. 19 is a schematic view of an ESS including a battery module according to the present disclosure. The ESS 400 according to the present disclosure may include a battery module 100 or 200 according to the present disclosure. In addition, the ESS 400 may include a plurality of battery modules 100, 200 according to an embodiment of the present disclosure, which are electrically connected to each other in order to have a large energy capacity. In addition, the ESS 400 according to an embodiment of the present disclosure may further include various other components of the ESS known at the time of filing the present disclosure. Moreover, this ESS 400 may be used in various places or devices, such as a smart grid system or an electric charging station. In particular, the ESS 400 according to an embodiment of the present disclosure may be a residential (building) ESS for home or office used to store energy in a residential house, office house, building, or the like.

Meanwhile, the terms indicating directions as used herein such as upper, lower, left, right, front, and rear are used for convenience of description only, and it is obvious to those skilled in the art that the term may change depending on the position of the stated element or an observer.

The present disclosure has been hereinabove described with regard to a limited number of embodiments and drawings, but the present disclosure is not limited thereto and it is obvious to those skilled in the art that a variety of modifications and changes may be made thereto within the technical aspects of the present disclosure and the equivalent scope of the appended claims.

| [Explanation of reference signs] ||
|---|---|
| 10: battery cell | 40: sealing portion |
| 50: resealing portion | 100, 200: battery module |
| 110: cell stack | 120, 220: module housing |
| 130, 230: side plate | 135: heat dissipation fin |
| 140, 240: top plate | 150, 250: base plate |
| 160: PC sheet | 170: mica sheet |
| 180: thermal spreader | 230a: spark direction switching portion |
| 232: fastening frame | 260: buffer pad |
| 270: insulating plate | 290: busbar frame assembly |
| 292: busbar frame | 294: busbar |
| 300: battery pack | 400: ESS |

What is claimed is:

1. A battery module comprising
a cell stack formed by stacking a plurality of battery cells comprising a receiving portion in which an electrode assembly is accommodated, a first edge portion and a second edge portion along a longitudinal direction around the receiving portion, and a third edge portion and a fourth edge portion along a width direction, in a vertical direction with the receiving portions facing each other,
wherein the battery cell comprises a resealing portion at the first edge portion, and comprises a sealing portion or an unsealed portion at the second edge portion, and
wherein the first edge portion and the second edge portion are alternately positioned along the vertical direction on both sides of the cell stack.

2. The battery module according to claim 1, further comprising a module housing accommodating the cell stack,
wherein the module housing comprises a pair of side plates located on both sides of the cell stack, and
wherein pair of side plates and the cell stack are spaced apart to form a space portion.

3. The battery module according to claim 2, further comprising a polycarbonate sheet and a mica sheet between the module housing and a side of the cell stack.

4. The battery module according to claim 2, wherein the first edge portion of approximately half of the plurality of battery cells faces a first side plate of the pair of side plates, and the first edge portion of the remaining battery cells faces a second side plate of the pair of side plates.

5. The battery module according to claim 2, further comprising a thermal spreader between the module housing and the side of the cell stack.

6. The battery module according to claim 2, wherein the module housing further comprises a base plate supporting the cell stack and a top plate covering an upper portion of the cell stack, and
wherein the base plate has a U-frame structure capable of wrapping and fixing a lower end of each side plate from an outside.

7. The battery module according to claim 6, wherein the top plate and the pair of side plates are connected to each other to form a U-frame structure.

8. The battery module according to claim 2, wherein the pair of side plates comprise a pair of spark direction switching portions formed by bending one end in the longitudinal direction toward the cell stack.

9. The battery module according to claim 8, further comprising a fastening frame that connects the pair of spark direction switching portions and has a central opening.

10. The battery module according to claim 9, wherein each of the plurality of battery cells comprises electrode leads at the third edge portion and the fourth edge portion,
wherein the module housing further comprises a top plate covering an upper portion of the cell stack, the module housing has a module opening formed in the longitudinal direction, and a busbar frame assembly covering the module opening, and
wherein the busbar frame assembly is in contact with the spark direction switching portion and the fastening frame.

11. The battery module according to claim 1, further comprising a module housing accommodating the cell stack,
wherein the module housing comprises a pair of side plates located on both sides of the cell stack and a top plate covering an upper portion of the cell stack, and
wherein a thickness of the pair of side plates is greater than a thickness of the top plate.

12. The battery module according to claim 1, further comprising a module housing accommodating the cell stack,
wherein the module housing comprises a pair of side plates located on both sides of the cell stack and a top plate covering an upper portion of the cell stack, and
wherein a specific heat of the pair of side plates is higher than a specific heat of the top plate.

13. The battery module according to claim 1, further comprising a module housing accommodating the cell stack,
wherein the module housing comprises a pair of side plates located on both sides of the cell stack, and
wherein heat dissipation fins are formed on an outer side of the side plate.

14. The battery module according to claim 1, further comprising a buffer pad located on at least one of an upper portion and a lower portion of the cell stack.

15. The battery module according to claim 1, further comprising an insulating plate located on at least one of an upper portion and a lower portion of the cell stack.

16. The battery module according to claim 1, further comprising a module housing accommodating the cell stack,
wherein the module housing comprises a pair of side plates located on both sides of the cell stack and a top plate covering an upper portion of the cell stack,
wherein the module housing has a module opening formed in the longitudinal direction, and
wherein the module housing further comprises a busbar frame assembly covering the module opening.

17. A battery pack comprising a battery module according to claim 1.

18. An energy storage system comprising a battery module according to claim 1.

* * * * *